(12) United States Patent
Rao et al.

(10) Patent No.: US 10,574,575 B2
(45) Date of Patent: Feb. 25, 2020

(54) NETWORK FLOW STITCHING USING MIDDLE BOX FLOW STITCHING

(71) Applicant: Cisco Technology, Inc., San Jose, CA (US)

(72) Inventors: Supreeth Rao, Cupertino, CA (US); Navindra Yadav, Cupertino, CA (US); Umamaheswaran Arumugam, San Jose, CA (US); Micheal Watts, Mill Valley, CA (US); Shashi Gandham, Fremont, CA (US); Prasannakumar Jobigenahally Malleshaiah, Sunnyvale, CA (US); Duy Nguyen, San Jose, CA (US); Hai Vu, San Jose, CA (US); Tapan Shrikrishna Patwardhan, Mountain View, CA (US); Aiyesha Ma, San Francisco, CA (US); Xuan Zou, Sunnyvale, CA (US); Jothi Prakash Prabakaran, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 96 days.

(21) Appl. No.: 15/966,561

(22) Filed: Apr. 30, 2018

(65) Prior Publication Data

US 2019/0230035 A1 Jul. 25, 2019

Related U.S. Application Data

(60) Provisional application No. 62/621,925, filed on Jan. 25, 2018.

(51) Int. Cl.
*H04L 12/801* (2013.01)
*H04L 12/24* (2006.01)
(Continued)

(52) U.S. Cl.
CPC ............ *H04L 47/10* (2013.01); *H04L 41/082* (2013.01); *H04L 41/0893* (2013.01);
(Continued)

(58) Field of Classification Search
CPC ... H04L 47/10; H04L 41/082; H04L 43/0876; H04L 45/38
See application file for complete search history.

(56) References Cited

U.S. PATENT DOCUMENTS 5,086,385 A 2/1992 Launey et al.
5,319,754 A 6/1994 Meinecke et al.
(Continued)

FOREIGN PATENT DOCUMENTS

CN 101093452 12/2007
CN 101770551 7/2010
(Continued)

OTHER PUBLICATIONS

Arista Networks, Inc., "Application Visibility and Network Telemtry using Splunk," Arista White Paper, Nov. 2013, 11 pages.
(Continued)

*Primary Examiner* — Saad A. Waqas
(74) *Attorney, Agent, or Firm* — Polsinelli PC

(57) ABSTRACT

Systems, methods, and computer-readable media for flow stitching network traffic flow segments at a middlebox in a network environment. In some embodiments, a method can include collecting flow records of traffic flow segments at a middlebox in a network environment including one or more transaction identifiers assigned to the traffic flow segments. The traffic flow segments can correspond to one or more traffic flows passing through the middlebox and flow directions of the traffic flow segments with respect to the middlebox can be identified using the flow records. The traffic flow segments can be stitched together based on the one or more
(Continued)

transaction identifiers and the flow directions of the traffic flow segments to form a stitched traffic flow of the one or more traffic flows passing through the middlebox. The stitched traffic flow can be incorporated as part of network traffic data for the network environment.

20 Claims, 7 Drawing Sheets

(51) Int. Cl.
    *H04L 12/26*     (2006.01)
    *H04L 29/08*     (2006.01)
    *H04L 12/721*     (2013.01)
    *H04L 12/911*     (2013.01)

(52) U.S. Cl.
    CPC ........ *H04L 43/026* (2013.01); *H04L 43/0876* (2013.01); *H04L 45/70* (2013.01); *H04L 47/822* (2013.01); *H04L 67/14* (2013.01); *H04L 43/10* (2013.01); *H04L 45/38* (2013.01)

(56) References Cited

U.S. PATENT DOCUMENTS

| | | |
|---|---|---|
| 5,400,246 A | 3/1995 | Wilson et al. |
| 5,436,909 A | 7/1995 | Dev et al. |
| 5,555,416 A | 9/1996 | Owens et al. |
| 5,726,644 A | 3/1998 | Jednacz et al. |
| 5,742,829 A | 4/1998 | Davis et al. |
| 5,822,731 A | 10/1998 | Schultz |
| 5,831,848 A | 11/1998 | Rielly et al. |
| 5,903,545 A | 5/1999 | Sabourin et al. |
| 6,012,096 A | 1/2000 | Link et al. |
| 6,141,595 A | 10/2000 | Gloudeman et al. |
| 6,144,962 A | 11/2000 | Weinberg et al. |
| 6,239,699 B1 | 5/2001 | Ronnen |
| 6,247,058 B1 | 6/2001 | Miller et al. |
| 6,249,241 B1 | 6/2001 | Jordan et al. |
| 6,330,562 B1 | 12/2001 | Boden et al. |
| 6,353,775 B1 | 3/2002 | Nichols |
| 6,525,658 B2 | 2/2003 | Streetman et al. |
| 6,546,420 B1 | 4/2003 | Lemler et al. |
| 6,597,663 B1 | 7/2003 | Rekhter |
| 6,611,896 B1 | 8/2003 | Mason, Jr. et al. |
| 6,654,750 B1 | 11/2003 | Adams et al. |
| 6,728,779 B1 | 4/2004 | Griffin et al. |
| 6,801,878 B1 | 10/2004 | Hintz et al. |
| 6,816,461 B1 | 11/2004 | Scrandis et al. |
| 6,847,993 B1 | 1/2005 | Novaes et al. |
| 6,848,106 B1 | 1/2005 | Hipp |
| 6,925,490 B1 | 8/2005 | Novaes et al. |
| 6,958,998 B2 | 10/2005 | Shorey |
| 6,983,323 B2 | 1/2006 | Cantrell et al. |
| 6,996,817 B2 | 2/2006 | Birum et al. |
| 6,999,452 B1 | 2/2006 | Drummond-Murray et al. |
| 7,002,464 B2 | 2/2006 | Bruemmer et al. |
| 7,024,468 B1 | 4/2006 | Meyer et al. |
| 7,096,368 B2 | 8/2006 | Kouznetsov et al. |
| 7,111,055 B2 | 9/2006 | Falkner |
| 7,120,934 B2 | 10/2006 | Ishikawa |
| 7,133,923 B2 | 11/2006 | MeLampy et al. |
| 7,162,643 B1 | 1/2007 | Sankaran et al. |
| 7,181,769 B1 | 2/2007 | Keanini et al. |
| 7,185,103 B1 | 2/2007 | Jain |
| 7,203,740 B1 | 4/2007 | Putzolu et al. |
| 7,302,487 B2 | 11/2007 | Ylonen et al. |
| 7,337,206 B1 | 2/2008 | Wen et al. |
| 7,349,761 B1 | 3/2008 | Cruse |
| 7,353,511 B1 | 4/2008 | Ziese |
| 7,356,679 B1 | 4/2008 | Le et al. |
| 7,360,072 B1 | 4/2008 | Soltis et al. |
| 7,370,092 B2 | 5/2008 | Aderton et al. |
| 7,395,195 B2 | 7/2008 | Suenbuel et al. |
| 7,444,404 B2 | 10/2008 | Wetherall et al. |
| 7,466,681 B2 | 12/2008 | Ashwood-Smith et al. |
| 7,467,205 B1 | 12/2008 | Dempster et al. |
| 7,496,040 B2 | 2/2009 | Seo |
| 7,496,575 B2 | 2/2009 | Buccella et al. |
| 7,530,105 B2 | 5/2009 | Gilbert et al. |
| 7,539,770 B2 | 5/2009 | Meier |
| 7,568,107 B1 | 7/2009 | Rathi et al. |
| 7,610,330 B1 | 10/2009 | Quinn et al. |
| 7,633,942 B2 | 12/2009 | Bearden et al. |
| 7,644,438 B1 | 1/2010 | Dash et al. |
| 7,676,570 B2 | 3/2010 | Levy et al. |
| 7,681,131 B1 | 3/2010 | Quarterman et al. |
| 7,693,947 B2 | 4/2010 | Judge et al. |
| 7,743,242 B2 | 6/2010 | Oberhaus et al. |
| 7,752,307 B2 | 7/2010 | Takara |
| 7,774,498 B1 | 8/2010 | Kraemer et al. |
| 7,783,457 B2 | 8/2010 | Cunningham |
| 7,787,480 B1 | 8/2010 | Mehta et al. |
| 7,788,477 B1 | 8/2010 | Huang et al. |
| 7,808,897 B1 | 10/2010 | Mehta et al. |
| 7,813,822 B1 | 10/2010 | Hoffberg |
| 7,844,696 B2 | 11/2010 | Labovitz et al. |
| 7,844,744 B2 | 11/2010 | Abercrombie et al. |
| 7,864,707 B2 | 1/2011 | Dimitropoulos et al. |
| 7,873,025 B2 | 1/2011 | Patel et al. |
| 7,873,074 B1 | 1/2011 | Boland |
| 7,874,001 B2 | 1/2011 | Beck et al. |
| 7,885,197 B2 | 2/2011 | Metzler |
| 7,895,649 B1 | 2/2011 | Brook et al. |
| 7,904,420 B2 | 3/2011 | Ianni |
| 7,930,752 B2 | 4/2011 | Hertzog et al. |
| 7,934,248 B1 | 4/2011 | Yehuda et al. |
| 7,957,934 B2 | 6/2011 | Greifeneder |
| 7,961,637 B2 | 6/2011 | McBeath |
| 7,970,946 B1 | 6/2011 | Djabarov et al. |
| 7,975,035 B2 | 7/2011 | Popescu et al. |
| 8,001,610 B1 | 8/2011 | Chickering et al. |
| 8,005,935 B2 | 8/2011 | Pradhan et al. |
| 8,040,232 B2 | 10/2011 | Oh et al. |
| 8,040,822 B2 | 10/2011 | Proulx et al. |
| 8,056,134 B1 | 11/2011 | Ogilvie |
| 8,115,617 B2 | 2/2012 | Thubert et al. |
| 8,135,657 B2 | 3/2012 | Kapoor et al. |
| 8,156,430 B2 | 4/2012 | Newman |
| 8,160,063 B2 | 4/2012 | Maltz et al. |
| 8,179,809 B1 | 5/2012 | Eppstein et al. |
| 8,181,248 B2 | 5/2012 | Oh et al. |
| 8,185,824 B1 | 5/2012 | Mitchell et al. |
| 8,239,365 B2 | 8/2012 | Salman |
| 8,239,915 B1 | 8/2012 | Satish et al. |
| 8,250,657 B1 | 8/2012 | Nachenberg et al. |
| 8,255,972 B2 | 8/2012 | Azagury et al. |
| 8,266,697 B2 | 9/2012 | Coffman |
| 8,272,875 B1 | 9/2012 | Jurmain |
| 8,281,397 B2 | 10/2012 | Vaidyanathan et al. |
| 8,291,495 B1 | 10/2012 | Burns et al. |
| 8,296,847 B2 | 10/2012 | Mendonca et al. |
| 8,311,973 B1 | 11/2012 | Zadeh |
| 8,365,286 B2 | 1/2013 | Poston |
| 8,370,407 B1 | 2/2013 | Devarajan et al. |
| 8,381,289 B1 | 2/2013 | Pereira et al. |
| 8,391,270 B2 | 3/2013 | Van Der Stok et al. |
| 8,407,164 B2 | 3/2013 | Malik et al. |
| 8,407,798 B1 | 3/2013 | Lotem et al. |
| 8,413,235 B1 | 4/2013 | Chen et al. |
| 8,442,073 B2 | 5/2013 | Skubacz et al. |
| 8,451,731 B1 | 5/2013 | Lee et al. |
| 8,462,212 B1 | 6/2013 | Kundu et al. |
| 8,489,765 B2 | 7/2013 | Vasseur et al. |
| 8,499,348 B1 | 7/2013 | Rubin |
| 8,516,590 B1 | 8/2013 | Ranadive et al. |
| 8,527,977 B1 | 9/2013 | Cheng et al. |
| 8,549,635 B2 | 10/2013 | Muttik et al. |
| 8,570,861 B1 | 10/2013 | Brandwine et al. |
| 8,572,600 B2 | 10/2013 | Chung et al. |
| 8,572,734 B2 | 10/2013 | McConnell et al. |
| 8,572,735 B2 | 10/2013 | Ghosh et al. |
| 8,572,739 B1 | 10/2013 | Cruz et al. |

(56) References Cited

U.S. PATENT DOCUMENTS

| | | |
|---|---|---|
| 8,588,081 B2 | 11/2013 | Salam et al. |
| 8,600,726 B1 | 12/2013 | Varshney et al. |
| 8,613,084 B2 | 12/2013 | Dalcher |
| 8,615,803 B2 | 12/2013 | Dacier et al. |
| 8,630,316 B2 | 1/2014 | Haba |
| 8,631,464 B2 | 1/2014 | Belakhdar et al. |
| 8,640,086 B2 | 1/2014 | Bonev et al. |
| 8,656,493 B2 | 2/2014 | Capalik |
| 8,661,544 B2 | 2/2014 | Yen et al. |
| 8,677,487 B2 | 3/2014 | Balupari et al. |
| 8,683,389 B1 | 3/2014 | Bar-Yam et al. |
| 8,706,914 B2 | 4/2014 | Duchesneau |
| 8,713,676 B2 | 4/2014 | Pandrangi et al. |
| 8,719,452 B1 | 5/2014 | Ding et al. |
| 8,719,835 B2 | 5/2014 | Kanso et al. |
| 8,750,287 B2 | 6/2014 | Bui et al. |
| 8,752,042 B2 | 6/2014 | Ratica |
| 8,752,179 B2 | 6/2014 | Zaitsev |
| 8,755,396 B2 | 6/2014 | Sindhu et al. |
| 8,762,951 B1 | 6/2014 | Kosche et al. |
| 8,769,084 B2 | 7/2014 | Westerfeld et al. |
| 8,775,577 B1 | 7/2014 | Alford et al. |
| 8,776,180 B2 | 7/2014 | Kumar et al. |
| 8,812,448 B1 | 8/2014 | Anderson et al. |
| 8,812,725 B2 | 8/2014 | Kulkarni |
| 8,813,236 B1 | 8/2014 | Saha et al. |
| 8,825,848 B1 | 9/2014 | Dotan et al. |
| 8,832,013 B1 | 9/2014 | Adams et al. |
| 8,832,461 B2 | 9/2014 | Saroiu et al. |
| 8,849,926 B2 | 9/2014 | Marzencki et al. |
| 8,881,258 B2 | 11/2014 | Paul et al. |
| 8,887,238 B2 | 11/2014 | Howard et al. |
| 8,904,520 B1 | 12/2014 | Nachenberg et al. |
| 8,908,685 B2 | 12/2014 | Patel et al. |
| 8,914,497 B1 | 12/2014 | Xiao et al. |
| 8,931,043 B2 | 1/2015 | Cooper et al. |
| 8,954,610 B2 | 2/2015 | Berke et al. |
| 8,955,124 B2 | 2/2015 | Kim et al. |
| 8,966,021 B1 | 2/2015 | Allen |
| 8,966,625 B1 | 2/2015 | Zuk et al. |
| 8,973,147 B2 | 3/2015 | Pearcy et al. |
| 8,984,331 B2 | 3/2015 | Quinn |
| 8,990,386 B2 | 3/2015 | He et al. |
| 8,996,695 B2 | 3/2015 | Anderson et al. |
| 8,997,227 B1 | 3/2015 | Mhatre et al. |
| 9,003,292 B2 * | 4/2015 | Smith ............... H04L 41/12 715/733 |
| 9,014,047 B2 | 4/2015 | Alcala et al. |
| 9,015,716 B2 | 4/2015 | Fletcher et al. |
| 9,071,575 B2 | 6/2015 | Lemaster et al. |
| 9,088,598 B1 | 7/2015 | Zhang et al. |
| 9,110,905 B2 | 8/2015 | Polley et al. |
| 9,117,075 B1 | 8/2015 | Yeh |
| 9,130,836 B2 | 9/2015 | Kapadia et al. |
| 9,152,789 B2 | 10/2015 | Natarajan et al. |
| 9,160,764 B2 | 10/2015 | Stiansen et al. |
| 9,170,917 B2 | 10/2015 | Kumar et al. |
| 9,178,906 B1 | 11/2015 | Chen et al. |
| 9,185,127 B2 | 11/2015 | Neou et al. |
| 9,191,400 B1 | 11/2015 | Ptasinski et al. |
| 9,191,402 B2 | 11/2015 | Yan |
| 9,197,654 B2 | 11/2015 | Ben-Shalom et al. |
| 9,225,793 B2 | 12/2015 | Dutta et al. |
| 9,237,111 B2 | 1/2016 | Banavalikar et al. |
| 9,246,702 B1 | 1/2016 | Sharma et al. |
| 9,246,773 B2 | 1/2016 | Degioanni |
| 9,253,042 B2 | 2/2016 | Lumezanu et al. |
| 9,253,206 B1 | 2/2016 | Fleischman |
| 9,258,217 B2 | 2/2016 | Duffield et al. |
| 9,281,940 B2 | 3/2016 | Matsuda et al. |
| 9,286,047 B1 | 3/2016 | Avramov et al. |
| 9,294,486 B1 | 3/2016 | Chiang et al. |
| 9,317,574 B1 | 4/2016 | Brisebois et al. |
| 9,319,384 B2 | 4/2016 | Yan et al. |
| 9,369,435 B2 | 6/2016 | Short et al. |
| 9,369,479 B2 | 6/2016 | Lin |
| 9,378,068 B2 | 6/2016 | Anantharam et al. |
| 9,396,327 B2 | 6/2016 | Shimomura et al. |
| 9,405,903 B1 | 8/2016 | Xie et al. |
| 9,417,985 B2 | 8/2016 | Baars et al. |
| 9,418,222 B1 | 8/2016 | Rivera et al. |
| 9,426,068 B2 | 8/2016 | Dunbar et al. |
| 9,454,324 B1 | 9/2016 | Madhavapeddi |
| 9,462,013 B1 | 10/2016 | Boss et al. |
| 9,465,696 B2 | 10/2016 | McNeil et al. |
| 9,501,744 B1 | 11/2016 | Brisebois et al. |
| 9,531,589 B2 | 12/2016 | Clemm et al. |
| 9,563,517 B1 | 2/2017 | Natanzon et al. |
| 9,621,413 B1 | 4/2017 | Lee |
| 9,634,915 B2 | 4/2017 | Bley |
| 9,645,892 B1 | 5/2017 | Patwardhan |
| 9,684,453 B2 | 6/2017 | Holt et al. |
| 9,697,033 B2 | 7/2017 | Koponen et al. |
| 9,733,973 B2 | 8/2017 | Prasad et al. |
| 9,749,145 B2 | 8/2017 | Banavalikar et al. |
| 9,800,608 B2 | 10/2017 | Korsunsky et al. |
| 9,904,584 B2 | 2/2018 | Konig et al. |
| 9,916,538 B2 | 3/2018 | Zadeh et al. |
| 9,935,851 B2 | 4/2018 | Gandham et al. |
| 10,009,240 B2 | 6/2018 | Rao et al. |
| 2001/0028646 A1 | 10/2001 | Arts et al. |
| 2002/0053033 A1 | 5/2002 | Cooper et al. |
| 2002/0097687 A1 | 7/2002 | Meiri et al. |
| 2002/0103793 A1 | 8/2002 | Koller et al. |
| 2002/0107857 A1 | 8/2002 | Teraslinna |
| 2002/0141343 A1 | 10/2002 | Bays |
| 2002/0184393 A1 | 12/2002 | Leddy et al. |
| 2003/0023601 A1 | 1/2003 | Fortier, Jr. et al. |
| 2003/0065986 A1 | 4/2003 | Fraenkel et al. |
| 2003/0097439 A1 | 5/2003 | Strayer et al. |
| 2003/0126242 A1 | 7/2003 | Chang |
| 2003/0145232 A1 | 7/2003 | Poletto et al. |
| 2003/0151513 A1 | 8/2003 | Herrmann et al. |
| 2003/0154399 A1 | 8/2003 | Zuk et al. |
| 2003/0177208 A1 | 9/2003 | Harvey, IV |
| 2004/0019676 A1 | 1/2004 | Iwatsuki et al. |
| 2004/0030776 A1 | 2/2004 | Cantrell et al. |
| 2004/0213221 A1 | 10/2004 | Civanlar et al. |
| 2004/0220984 A1 | 11/2004 | Dudfield et al. |
| 2004/0243533 A1 | 12/2004 | Dempster et al. |
| 2004/0255050 A1 | 12/2004 | Takehiro et al. |
| 2004/0268149 A1 | 12/2004 | Aaron |
| 2005/0028154 A1 | 2/2005 | Smith et al. |
| 2005/0039104 A1 | 2/2005 | Shah et al. |
| 2005/0063377 A1 | 3/2005 | Bryant et al. |
| 2005/0083933 A1 | 4/2005 | Fine et al. |
| 2005/0108331 A1 | 5/2005 | Osterman |
| 2005/0122325 A1 | 6/2005 | Twait |
| 2005/0138157 A1 | 6/2005 | Jung et al. |
| 2005/0166066 A1 | 7/2005 | Ahuja et al. |
| 2005/0177829 A1 | 8/2005 | Vishwanath |
| 2005/0182681 A1 | 8/2005 | Bruskotter et al. |
| 2005/0185621 A1 | 8/2005 | Sivakumar et al. |
| 2005/0198247 A1 | 9/2005 | Perry et al. |
| 2005/0198371 A1 | 9/2005 | Smith et al. |
| 2005/0198629 A1 | 9/2005 | Vishwanath |
| 2005/0207376 A1 | 9/2005 | Ashwood-Smith et al. |
| 2005/0257244 A1 | 11/2005 | Joly et al. |
| 2005/0289244 A1 | 12/2005 | Sahu et al. |
| 2006/0048218 A1 | 3/2006 | Lingafelt et al. |
| 2006/0077909 A1 | 4/2006 | Saleh et al. |
| 2006/0080733 A1 | 4/2006 | Khosmood et al. |
| 2006/0089985 A1 | 4/2006 | Poletto |
| 2006/0095968 A1 | 5/2006 | Portolani et al. |
| 2006/0143432 A1 | 6/2006 | Rothman et al. |
| 2006/0156408 A1 | 7/2006 | Himberger et al. |
| 2006/0159032 A1 | 7/2006 | Ukrainetz et al. |
| 2006/0173912 A1 | 8/2006 | Lindvall et al. |
| 2006/0195448 A1 | 8/2006 | Newport |
| 2006/0272018 A1 | 11/2006 | Fouant |
| 2006/0274659 A1 | 12/2006 | Ouderkirk |
| 2006/0280179 A1 | 12/2006 | Meier |
| 2006/0294219 A1 | 12/2006 | Ogawa et al. |
| 2007/0014275 A1 | 1/2007 | Bettink et al. |

(56) References Cited

U.S. PATENT DOCUMENTS

| | | |
|---|---|---|
| 2007/0025306 A1 | 2/2007 | Cox et al. |
| 2007/0044147 A1 | 2/2007 | Choi et al. |
| 2007/0097976 A1 | 5/2007 | Wood et al. |
| 2007/0118654 A1 | 5/2007 | Jamkhedkar et al. |
| 2007/0127491 A1 | 6/2007 | Verzijp et al. |
| 2007/0162420 A1 | 7/2007 | Ou et al. |
| 2007/0169179 A1 | 7/2007 | Narad |
| 2007/0195729 A1 | 8/2007 | Li et al. |
| 2007/0195794 A1 | 8/2007 | Fujita et al. |
| 2007/0195797 A1 | 8/2007 | Patel et al. |
| 2007/0201474 A1 | 8/2007 | Isobe |
| 2007/0211637 A1 | 9/2007 | Mitchell |
| 2007/0214348 A1 | 9/2007 | Danielsen |
| 2007/0230415 A1 | 10/2007 | Malik |
| 2007/0232265 A1 | 10/2007 | Park et al. |
| 2007/0250930 A1 | 10/2007 | Aziz et al. |
| 2007/0300061 A1 | 12/2007 | Kim et al. |
| 2008/0002697 A1 | 1/2008 | Anantharamaiah et al. |
| 2008/0022385 A1 | 1/2008 | Crowell et al. |
| 2008/0028389 A1 | 1/2008 | Genty et al. |
| 2008/0046708 A1 | 2/2008 | Fitzgerald et al. |
| 2008/0049633 A1 | 2/2008 | Edwards et al. |
| 2008/0056124 A1 | 3/2008 | Nanda et al. |
| 2008/0082662 A1 | 4/2008 | Danliker et al. |
| 2008/0101234 A1 | 5/2008 | Nakil et al. |
| 2008/0120350 A1 | 5/2008 | Grabowski et al. |
| 2008/0126534 A1 | 5/2008 | Mueller et al. |
| 2008/0141246 A1 | 6/2008 | Kuck et al. |
| 2008/0155245 A1 | 6/2008 | Lipscombe et al. |
| 2008/0250122 A1 | 10/2008 | Zsigmond et al. |
| 2008/0270199 A1 | 10/2008 | Chess et al. |
| 2008/0282347 A1 | 11/2008 | Dadhia et al. |
| 2008/0295163 A1 | 11/2008 | Kang |
| 2008/0301765 A1 | 12/2008 | Nicol et al. |
| 2009/0059934 A1 | 3/2009 | Aggarwal et al. |
| 2009/0064332 A1 | 3/2009 | Porras et al. |
| 2009/0109849 A1 | 4/2009 | Wood et al. |
| 2009/0133126 A1 | 5/2009 | Jang et al. |
| 2009/0138590 A1 | 5/2009 | Lee et al. |
| 2009/0180393 A1 | 7/2009 | Nakamura |
| 2009/0241170 A1 | 9/2009 | Kumar et al. |
| 2009/0292795 A1 | 11/2009 | Ford et al. |
| 2009/0296593 A1 | 12/2009 | Prescott |
| 2009/0300180 A1 | 12/2009 | Dehaan et al. |
| 2009/0307753 A1 | 12/2009 | Dupont et al. |
| 2009/0313373 A1 | 12/2009 | Hanna et al. |
| 2009/0313698 A1 | 12/2009 | Wahl |
| 2009/0319912 A1 | 12/2009 | Serr et al. |
| 2009/0323543 A1 | 12/2009 | Shimakura |
| 2009/0328219 A1 | 12/2009 | Narayanaswamy |
| 2010/0005288 A1 | 1/2010 | Rao et al. |
| 2010/0049839 A1 | 2/2010 | Parker et al. |
| 2010/0054241 A1 | 3/2010 | Shah et al. |
| 2010/0077445 A1 | 3/2010 | Schneider et al. |
| 2010/0095293 A1 | 4/2010 | O'Neill et al. |
| 2010/0095367 A1 | 4/2010 | Narayanaswamy |
| 2010/0095377 A1 | 4/2010 | Krywaniuk |
| 2010/0138526 A1 | 6/2010 | DeHaan et al. |
| 2010/0138810 A1 | 6/2010 | Komatsu et al. |
| 2010/0148940 A1 | 6/2010 | Gelvin et al. |
| 2010/0153316 A1 | 6/2010 | Duffield et al. |
| 2010/0153696 A1 | 6/2010 | Beachem et al. |
| 2010/0180016 A1 | 7/2010 | Bugwadia et al. |
| 2010/0194741 A1 | 8/2010 | Finocchio |
| 2010/0220584 A1 | 9/2010 | DeHaan et al. |
| 2010/0235514 A1 | 9/2010 | Beachem |
| 2010/0235879 A1 | 9/2010 | Burnside et al. |
| 2010/0235915 A1 | 9/2010 | Memon et al. |
| 2010/0287266 A1 | 11/2010 | Asati et al. |
| 2010/0303240 A1 | 12/2010 | Beachem |
| 2010/0306180 A1 | 12/2010 | Johnson et al. |
| 2010/0317420 A1 | 12/2010 | Hoffberg |
| 2010/0319060 A1 | 12/2010 | Aiken et al. |
| 2011/0004935 A1 | 1/2011 | Moffie et al. |
| 2011/0010585 A1 | 1/2011 | Bugenhagen et al. |
| 2011/0022641 A1 | 1/2011 | Werth et al. |
| 2011/0055381 A1 | 3/2011 | Narasimhan et al. |
| 2011/0055388 A1 | 3/2011 | Yumerefendi et al. |
| 2011/0066719 A1 | 3/2011 | Miryanov et al. |
| 2011/0069685 A1 | 3/2011 | Tofighbakhsh |
| 2011/0072119 A1 | 3/2011 | Bronstein et al. |
| 2011/0083125 A1 | 4/2011 | Komatsu et al. |
| 2011/0085556 A1 | 4/2011 | Breslin et al. |
| 2011/0103259 A1 | 5/2011 | Aybay et al. |
| 2011/0107074 A1 | 5/2011 | Chan et al. |
| 2011/0107331 A1 | 5/2011 | Evans et al. |
| 2011/0126136 A1 | 5/2011 | Abella et al. |
| 2011/0126275 A1 | 5/2011 | Anderson et al. |
| 2011/0145885 A1 | 6/2011 | Rivers et al. |
| 2011/0153039 A1 | 6/2011 | Gvelesiani et al. |
| 2011/0153811 A1 | 6/2011 | Jeong et al. |
| 2011/0158088 A1 | 6/2011 | Lofstrand et al. |
| 2011/0170860 A1 | 7/2011 | Smith et al. |
| 2011/0173490 A1 | 7/2011 | Narayanaswamy et al. |
| 2011/0185423 A1 | 7/2011 | Sallam |
| 2011/0196957 A1 | 8/2011 | Ayachitula et al. |
| 2011/0202655 A1 | 8/2011 | Sharma et al. |
| 2011/0214174 A1 | 9/2011 | Herzog et al. |
| 2011/0225207 A1 | 9/2011 | Subramanian et al. |
| 2011/0228696 A1 | 9/2011 | Agarwal et al. |
| 2011/0238793 A1 | 9/2011 | Bedare et al. |
| 2011/0246663 A1 | 10/2011 | Melsen et al. |
| 2011/0277034 A1 | 11/2011 | Hanson |
| 2011/0283277 A1 | 11/2011 | Castillo et al. |
| 2011/0302652 A1 | 12/2011 | Westerfeld |
| 2011/0314148 A1 | 12/2011 | Petersen et al. |
| 2011/0317982 A1 | 12/2011 | Xu et al. |
| 2012/0005542 A1 | 1/2012 | Petersen et al. |
| 2012/0079592 A1 | 3/2012 | Pandrangi |
| 2012/0089664 A1 | 4/2012 | Igelka |
| 2012/0102361 A1 | 4/2012 | Sass et al. |
| 2012/0102543 A1 | 4/2012 | Kohli et al. |
| 2012/0110188 A1 | 5/2012 | Van Biljon et al. |
| 2012/0117226 A1 | 5/2012 | Tanaka et al. |
| 2012/0117642 A1 | 5/2012 | Lin et al. |
| 2012/0136996 A1 | 5/2012 | Seo et al. |
| 2012/0137278 A1 | 5/2012 | Draper et al. |
| 2012/0137361 A1 | 5/2012 | Yi et al. |
| 2012/0140626 A1 | 6/2012 | Anand et al. |
| 2012/0195198 A1 | 8/2012 | Regan |
| 2012/0197856 A1 | 8/2012 | Banka et al. |
| 2012/0198541 A1 | 8/2012 | Reeves |
| 2012/0216271 A1 | 8/2012 | Cooper et al. |
| 2012/0218989 A1 | 8/2012 | Tanabe et al. |
| 2012/0219004 A1 | 8/2012 | Balus et al. |
| 2012/0233348 A1 | 9/2012 | Winters |
| 2012/0233473 A1 | 9/2012 | Vasseur et al. |
| 2012/0240232 A1 | 9/2012 | Azuma |
| 2012/0246303 A1 | 9/2012 | Petersen et al. |
| 2012/0254109 A1 | 10/2012 | Shukla et al. |
| 2012/0260227 A1 | 10/2012 | Shukla et al. |
| 2012/0278021 A1 | 11/2012 | Lin et al. |
| 2012/0281700 A1 | 11/2012 | Koganti et al. |
| 2012/0300628 A1 | 11/2012 | Prescott et al. |
| 2013/0003538 A1 | 1/2013 | Greenburg et al. |
| 2013/0003733 A1 | 1/2013 | Venkatesan et al. |
| 2013/0006935 A1 | 1/2013 | Grisby |
| 2013/0007435 A1 | 1/2013 | Bayani |
| 2013/0038358 A1 | 2/2013 | Cook et al. |
| 2013/0041934 A1 | 2/2013 | Annamalaisami et al. |
| 2013/0054682 A1 | 2/2013 | Malik et al. |
| 2013/0085889 A1 | 4/2013 | Fitting et al. |
| 2013/0086272 A1 | 4/2013 | Chen et al. |
| 2013/0103827 A1 | 4/2013 | Dunlap et al. |
| 2013/0107709 A1 | 5/2013 | Campbell et al. |
| 2013/0117847 A1* | 5/2013 | Friedman ............ H04L 63/102 726/22 |
| 2013/0124807 A1 | 5/2013 | Nielsen et al. |
| 2013/0125107 A1 | 5/2013 | Bandakka et al. |
| 2013/0145099 A1 | 6/2013 | Liu et al. |
| 2013/0148663 A1 | 6/2013 | Xiong |
| 2013/0159999 A1 | 6/2013 | Chiueh et al. |
| 2013/0173784 A1 | 7/2013 | Wang et al. |
| 2013/0174256 A1 | 7/2013 | Powers |

(56) References Cited

U.S. PATENT DOCUMENTS

| | | |
|---|---|---|
| 2013/0179487 A1 | 7/2013 | Lubetzky et al. |
| 2013/0179879 A1 | 7/2013 | Zhang et al. |
| 2013/0198517 A1 | 8/2013 | Mazzarella |
| 2013/0198839 A1 | 8/2013 | Wei et al. |
| 2013/0201986 A1 | 8/2013 | Sajassi et al. |
| 2013/0205293 A1 | 8/2013 | Levijarvi et al. |
| 2013/0219161 A1 | 8/2013 | Fontignie et al. |
| 2013/0219500 A1 | 8/2013 | Lukas et al. |
| 2013/0232498 A1 | 9/2013 | Mangtani et al. |
| 2013/0242999 A1 | 9/2013 | Kamble et al. |
| 2013/0246925 A1 | 9/2013 | Ahuja et al. |
| 2013/0247201 A1 | 9/2013 | Alperovitch et al. |
| 2013/0254879 A1 | 9/2013 | Chesla et al. |
| 2013/0268994 A1 | 10/2013 | Cooper et al. |
| 2013/0275579 A1 | 10/2013 | Hernandez et al. |
| 2013/0283374 A1 | 10/2013 | Zisapel et al. |
| 2013/0290521 A1 | 10/2013 | Labovitz |
| 2013/0297771 A1 | 11/2013 | Osterloh et al. |
| 2013/0301472 A1 | 11/2013 | Allan |
| 2013/0304900 A1 | 11/2013 | Trabelsi et al. |
| 2013/0305369 A1 | 11/2013 | Karta et al. |
| 2013/0318357 A1 | 11/2013 | Abraham et al. |
| 2013/0326623 A1 | 12/2013 | Kruglick |
| 2013/0333029 A1 | 12/2013 | Chesla et al. |
| 2013/0336164 A1 | 12/2013 | Yang et al. |
| 2013/0346736 A1 | 12/2013 | Cook et al. |
| 2013/0347103 A1 | 12/2013 | Veteikis et al. |
| 2014/0006610 A1 | 1/2014 | Formby et al. |
| 2014/0006871 A1 | 1/2014 | Lakshmanan et al. |
| 2014/0012814 A1 | 1/2014 | Bercovici et al. |
| 2014/0019972 A1 | 1/2014 | Yahalom et al. |
| 2014/0031005 A1 | 1/2014 | Sumcad et al. |
| 2014/0033193 A1 | 1/2014 | Palaniappan |
| 2014/0036688 A1 | 2/2014 | Stassinopoulos et al. |
| 2014/0040343 A1 | 2/2014 | Nickolov et al. |
| 2014/0047185 A1 | 2/2014 | Peterson et al. |
| 2014/0047372 A1 | 2/2014 | Gnezdov et al. |
| 2014/0056318 A1 | 2/2014 | Hansson et al. |
| 2014/0059200 A1 | 2/2014 | Nguyen et al. |
| 2014/0074946 A1 | 3/2014 | Dirstine et al. |
| 2014/0089494 A1 | 3/2014 | Dasari et al. |
| 2014/0092884 A1 | 4/2014 | Murphy et al. |
| 2014/0096058 A1 | 4/2014 | Molesky et al. |
| 2014/0105029 A1 | 4/2014 | Jain et al. |
| 2014/0115219 A1 | 4/2014 | Ajanovic et al. |
| 2014/0129942 A1 | 5/2014 | Rathod |
| 2014/0136680 A1* | 5/2014 | Joshi .................... H04L 43/026 709/224 |
| 2014/0137109 A1 | 5/2014 | Sharma et al. |
| 2014/0140244 A1 | 5/2014 | Kapadia et al. |
| 2014/0143825 A1 | 5/2014 | Behrendt et al. |
| 2014/0149490 A1 | 5/2014 | Luxenberg et al. |
| 2014/0156814 A1 | 6/2014 | Barabash et al. |
| 2014/0156861 A1 | 6/2014 | Cruz-Aguilar et al. |
| 2014/0164607 A1 | 6/2014 | Bai et al. |
| 2014/0165200 A1 | 6/2014 | Singla |
| 2014/0165207 A1 | 6/2014 | Engel et al. |
| 2014/0173623 A1 | 6/2014 | Chang et al. |
| 2014/0192639 A1 | 7/2014 | Smirnov |
| 2014/0201717 A1 | 7/2014 | Mascaro et al. |
| 2014/0215573 A1 | 7/2014 | Cepuran |
| 2014/0215621 A1 | 7/2014 | Xaypanya et al. |
| 2014/0224784 A1 | 8/2014 | Kohler |
| 2014/0225603 A1 | 8/2014 | Auguste et al. |
| 2014/0233387 A1 | 8/2014 | Zheng et al. |
| 2014/0269777 A1 | 9/2014 | Rothstein et al. |
| 2014/0280499 A1 | 9/2014 | Basavaiah et al. |
| 2014/0281030 A1 | 9/2014 | Cui et al. |
| 2014/0286354 A1 | 9/2014 | Van De Poel et al. |
| 2014/0289854 A1 | 9/2014 | Mahvi |
| 2014/0298461 A1 | 10/2014 | Hohndel et al. |
| 2014/0307686 A1 | 10/2014 | Su et al. |
| 2014/0317278 A1 | 10/2014 | Kersch et al. |
| 2014/0317737 A1 | 10/2014 | Shin et al. |
| 2014/0330616 A1 | 11/2014 | Lyras |
| 2014/0331048 A1 | 11/2014 | Casas-Sanchez et al. |
| 2014/0331276 A1 | 11/2014 | Frascadore et al. |
| 2014/0331280 A1 | 11/2014 | Porras et al. |
| 2014/0331304 A1 | 11/2014 | Wong |
| 2014/0348182 A1 | 11/2014 | Chandra et al. |
| 2014/0351203 A1 | 11/2014 | Kunnatur et al. |
| 2014/0351415 A1 | 11/2014 | Harrigan et al. |
| 2014/0359695 A1 | 12/2014 | Chari et al. |
| 2014/0369356 A1* | 12/2014 | Bryant .................. H04L 45/745 370/392 |
| 2015/0006689 A1 | 1/2015 | Szilagyi et al. |
| 2015/0006714 A1 | 1/2015 | Jain |
| 2015/0009840 A1 | 1/2015 | Pruthi et al. |
| 2015/0026809 A1 | 1/2015 | Altman et al. |
| 2015/0033305 A1 | 1/2015 | Shear et al. |
| 2015/0036480 A1 | 2/2015 | Huang et al. |
| 2015/0036533 A1 | 2/2015 | Sodhi et al. |
| 2015/0039751 A1 | 2/2015 | Harrigan et al. |
| 2015/0046882 A1 | 2/2015 | Menyhart et al. |
| 2015/0052441 A1 | 2/2015 | Degioanni |
| 2015/0058976 A1 | 2/2015 | Carney et al. |
| 2015/0067143 A1 | 3/2015 | Babakhan et al. |
| 2015/0067786 A1 | 3/2015 | Fiske |
| 2015/0082151 A1 | 3/2015 | Liang et al. |
| 2015/0082430 A1 | 3/2015 | Sridhara et al. |
| 2015/0085665 A1 | 3/2015 | Kompella et al. |
| 2015/0095332 A1 | 4/2015 | Beisiegel et al. |
| 2015/0112933 A1 | 4/2015 | Satapathy |
| 2015/0113133 A1 | 4/2015 | Srinivas et al. |
| 2015/0124608 A1 | 5/2015 | Agarwal et al. |
| 2015/0124652 A1 | 5/2015 | Dhamapurikar et al. |
| 2015/0128133 A1 | 5/2015 | Pohlmann |
| 2015/0128205 A1 | 5/2015 | Mahaffey et al. |
| 2015/0138993 A1 | 5/2015 | Forster et al. |
| 2015/0142962 A1 | 5/2015 | Srinivas et al. |
| 2015/0195291 A1 | 7/2015 | Zuk et al. |
| 2015/0222939 A1 | 8/2015 | Gallant et al. |
| 2015/0249622 A1 | 9/2015 | Phillips et al. |
| 2015/0256555 A1 | 9/2015 | Choi et al. |
| 2015/0261842 A1 | 9/2015 | Huang et al. |
| 2015/0261886 A1 | 9/2015 | Wu et al. |
| 2015/0271008 A1 | 9/2015 | Jain et al. |
| 2015/0271255 A1 | 9/2015 | Mackay et al. |
| 2015/0295945 A1 | 10/2015 | Canzanese, Jr. et al. |
| 2015/0312233 A1 | 10/2015 | Graham, III et al. |
| 2015/0356297 A1 | 10/2015 | Yang et al. |
| 2015/0347554 A1 | 12/2015 | Vasantham et al. |
| 2015/0358352 A1 | 12/2015 | Chasin et al. |
| 2016/0006753 A1 | 1/2016 | McDaid et al. |
| 2016/0019030 A1 | 1/2016 | Shukla et al. |
| 2016/0020959 A1 | 1/2016 | Rahaman |
| 2016/0021131 A1 | 1/2016 | Heilig |
| 2016/0026552 A1 | 1/2016 | Holden et al. |
| 2016/0036636 A1 | 2/2016 | Erickson et al. |
| 2016/0036837 A1 | 2/2016 | Jain et al. |
| 2016/0050132 A1 | 2/2016 | Zhang et al. |
| 2016/0072815 A1 | 3/2016 | Rieke et al. |
| 2016/0080414 A1 | 3/2016 | Kolton et al. |
| 2016/0087861 A1 | 3/2016 | Kuan et al. |
| 2016/0094394 A1 | 3/2016 | Sharma et al. |
| 2016/0094529 A1 | 3/2016 | Mityagin |
| 2016/0103692 A1 | 4/2016 | Guntaka et al. |
| 2016/0105350 A1 | 4/2016 | Greifeneder et al. |
| 2016/0112270 A1 | 4/2016 | Danait et al. |
| 2016/0112284 A1 | 4/2016 | Pon et al. |
| 2016/0119234 A1 | 4/2016 | Valencia Lopez et al. |
| 2016/0127395 A1 | 5/2016 | Underwood et al. |
| 2016/0147585 A1 | 5/2016 | Konig et al. |
| 2016/0162308 A1 | 6/2016 | Chen et al. |
| 2016/0162312 A1 | 6/2016 | Doherty et al. |
| 2016/0173446 A1 | 6/2016 | Nantel |
| 2016/0173535 A1 | 6/2016 | Barabash et al. |
| 2016/0183093 A1 | 6/2016 | Vaughn et al. |
| 2016/0191476 A1 | 6/2016 | Schutz et al. |
| 2016/0205002 A1 | 7/2016 | Rieke et al. |
| 2016/0216994 A1 | 7/2016 | Sefidcon et al. |
| 2016/0217022 A1 | 7/2016 | Velipasaoglu et al. |
| 2016/0255082 A1 | 9/2016 | Rathod |
| 2016/0269424 A1 | 9/2016 | Chandola et al. |

(56) References Cited

U.S. PATENT DOCUMENTS

| | | |
|---|---|---|
| 2016/0269442 A1 | 9/2016 | Shieh |
| 2016/0269482 A1 | 9/2016 | Jamjoom et al. |
| 2016/0294691 A1 | 10/2016 | Joshi |
| 2016/0308908 A1 | 10/2016 | Kirby et al. |
| 2016/0337204 A1 | 11/2016 | Dubey et al. |
| 2016/0357424 A1 | 12/2016 | Pang et al. |
| 2016/0357546 A1 | 12/2016 | Chang et al. |
| 2016/0357587 A1 | 12/2016 | Yadav et al. |
| 2016/0357957 A1 | 12/2016 | Deen et al. |
| 2016/0359592 A1 | 12/2016 | Kulshreshtha et al. |
| 2016/0359628 A1 | 12/2016 | Singh et al. |
| 2016/0359658 A1 | 12/2016 | Yadav et al. |
| 2016/0359673 A1 | 12/2016 | Gupta et al. |
| 2016/0359677 A1 | 12/2016 | Kulshreshtha et al. |
| 2016/0359678 A1 | 12/2016 | Madani et al. |
| 2016/0359679 A1 | 12/2016 | Parasdehgheibi et al. |
| 2016/0359680 A1 | 12/2016 | Parasdehgheibi et al. |
| 2016/0359686 A1 | 12/2016 | Parasdehgheibi et al. |
| 2016/0359695 A1 | 12/2016 | Yadav et al. |
| 2016/0359696 A1 | 12/2016 | Yadav et al. |
| 2016/0359697 A1 | 12/2016 | Scheib et al. |
| 2016/0359698 A1 | 12/2016 | Deen et al. |
| 2016/0359699 A1 | 12/2016 | Gandham et al. |
| 2016/0359700 A1 | 12/2016 | Pang et al. |
| 2016/0359701 A1 | 12/2016 | Pang et al. |
| 2016/0359703 A1 | 12/2016 | Gandham et al. |
| 2016/0359704 A1 | 12/2016 | Gandham et al. |
| 2016/0359705 A1 | 12/2016 | Parasdehgheibi et al. |
| 2016/0359708 A1 | 12/2016 | Gandham et al. |
| 2016/0359709 A1 | 12/2016 | Deen et al. |
| 2016/0359711 A1 | 12/2016 | Deen et al. |
| 2016/0359712 A1 | 12/2016 | Alizadeh Attar et al. |
| 2016/0359740 A1 | 12/2016 | Parasdehgheibi et al. |
| 2016/0359759 A1 | 12/2016 | Singh et al. |
| 2016/0359872 A1* | 12/2016 | Yadav .................. H04L 43/04 |
| 2016/0359877 A1 | 12/2016 | Kulshreshtha et al. |
| 2016/0359878 A1 | 12/2016 | Prasad et al. |
| 2016/0359879 A1 | 12/2016 | Deen et al. |
| 2016/0359880 A1 | 12/2016 | Pang et al. |
| 2016/0359881 A1 | 12/2016 | Yadav et al. |
| 2016/0359888 A1 | 12/2016 | Gupta et al. |
| 2016/0359889 A1 | 12/2016 | Yadav et al. |
| 2016/0359890 A1 | 12/2016 | Deen et al. |
| 2016/0359891 A1 | 12/2016 | Pang et al. |
| 2016/0359897 A1 | 12/2016 | Yadav et al. |
| 2016/0359905 A1 | 12/2016 | Touboul et al. |
| 2016/0359912 A1 | 12/2016 | Gupta et al. |
| 2016/0359913 A1 | 12/2016 | Gupta et al. |
| 2016/0359914 A1 | 12/2016 | Deen et al. |
| 2016/0359915 A1 | 12/2016 | Gupta et al. |
| 2016/0359917 A1 | 12/2016 | Rao et al. |
| 2016/0373481 A1 | 12/2016 | Sultan et al. |
| 2016/0380865 A1 | 12/2016 | Dubai et al. |
| 2017/0006141 A1 | 1/2017 | Bhadra |
| 2017/0024453 A1 | 1/2017 | Raja et al. |
| 2017/0032310 A1 | 2/2017 | Mimnaugh |
| 2017/0034018 A1 | 2/2017 | Parasdehgheibi et al. |
| 2017/0048121 A1 | 2/2017 | Hobbs et al. |
| 2017/0070582 A1 | 3/2017 | Desai et al. |
| 2017/0085483 A1 | 3/2017 | Mihaly et al. |
| 2017/0208487 A1 | 7/2017 | Ratakonda et al. |
| 2017/0250880 A1 | 8/2017 | Akens et al. |
| 2017/0250951 A1 | 8/2017 | Wang et al. |
| 2017/0289067 A1 | 10/2017 | Lu et al. |
| 2017/0295141 A1 | 10/2017 | Thubert et al. |
| 2017/0302691 A1 | 10/2017 | Singh et al. |
| 2017/0331747 A1 | 11/2017 | Singh et al. |
| 2017/0346736 A1 | 11/2017 | Chander et al. |
| 2017/0364380 A1 | 12/2017 | Frye, Jr. et al. |
| 2018/0006911 A1 | 1/2018 | Dickey |
| 2018/0007115 A1 | 1/2018 | Nedeltchev et al. |
| 2018/0013670 A1 | 1/2018 | Kapadia et al. |
| 2018/0145906 A1 | 5/2018 | Yadav |
| 2018/0332100 A1* | 11/2018 | Bhaskar .................. H04L 67/06 |

FOREIGN PATENT DOCUMENTS

| | | |
|---|---|---|
| CN | 102521537 | 6/2012 |
| CN | 103023970 | 4/2013 |
| CN | 103716137 | 4/2014 |
| CN | 104065518 | 9/2014 |
| CN | 107196807 A | 9/2017 |
| EP | 0811942 | 12/1997 |
| EP | 1076848 | 7/2002 |
| EP | 1383261 | 1/2004 |
| EP | 1450511 | 8/2004 |
| EP | 2045974 | 4/2008 |
| EP | 2043320 | 4/2009 |
| EP | 2 860 912 A1 | 4/2015 |
| EP | 2887595 | 6/2015 |
| JP | 2009-016906 | 1/2009 |
| KR | 1394338 | 5/2014 |
| WO | WO 2007/014314 | 2/2007 |
| WO | WO 2007/070711 | 6/2007 |
| WO | WO 2008/069439 | 6/2008 |
| WO | WO 2013/030830 | 3/2013 |
| WO | WO 2015/042171 | 3/2015 |
| WO | WO 2015/099778 | 7/2015 |
| WO | WO 2016/004075 | 1/2016 |
| WO | WO 2016/019523 | 2/2016 |

OTHER PUBLICATIONS

Australian Government Department of Defence, Intelligence and Security, "Top 4 Strategies Targeted Cyber Intrusions," Cyber Security Operations Centre Jul. 2013, http://www.asd.gov.au/infosec/top-mitigations/top-4-strategies-explained.htm.

Author Unknown, "Blacklists & Dynamic Reputation: Understanding Why the Evolving Threat Eludes Blacklists," www.dambala.com, 9 pages, Dambala, Atlanta, GA, USA.

Aydin, Galip, et al., "Architecture and Implementation of a Scalable Sensor Data Storage and Analysis Using Cloud Computing and Big Data Technologies," Journal of Sensors, vol. 2015, Article ID 834217, Feb. 2015, 11 pages.

Backes, Michael, et al., "Data Lineage in Malicious Environments," IEEE 2015, pp. 1-13.

Bauch, Petr, "Reader's Report of Master's Thesis, Analysis and Testing of Distributed NoSQL Datastore Riak," May 28, 2015, Brno. 2 pages.

Bayati, Mohsen, et al., "Message-Passing Algorithms for Sparse Network Alignment," Mar. 2013, 31 pages.

Berezinski, Przemyslaw, et al., "An Entropy-Based Network Anomaly Detection Method," Entropy, 2015, vol. 17, www.mdpi.com/journal/entropy, pp. 2367-2408.

Berthier, Robin, et al. "Nfsight: Netflow-based Network Awareness Tool," 2010, 16 pages.

Bhuyan, Dhiraj, "Fighting Bots and Botnets," 2006, pp. 23-28.

Blair, Dana, et al., U.S. Appl. No. 62/106,006, filed Jan. 21, 2015, entitled "Monitoring Network Policy Compliance."

Bosch, Greg, "Virtualization," 2010, 33 pages.

Breen, Christopher, "MAC 911, How to dismiss Mac App Store Notifications," Macworld.com, Mar. 24, 2014, 3 pages.

Chandran, Midhun, et al., "Monitoring in a Virtualized Environment," GSTF International Journal on Computing, vol. 1, No. 1, Aug. 2010.

Chari, Suresh, et al., "Ensuring continuous compliance through reconciling policy with usage," Proceedings of the 18th ACM symposium on Access control models and technologies (SACMAT '13). ACM, New York, NY, USA, 49-60.

Chen, Xu, et al., "Automating network application dependency discovery: experiences, limitations, and new solutions," 8th USENIX conference on Operating systems design and implementation (OSDI'08), USENIX Association, Berkeley, CA, USA, 117-130.

Chou, C.W., et al., "Optical Clocks and Relativity," Science vol. 329, Sep. 24, 2010, pp. 1630-1633.

Cisco Systems, "Cisco Network Analysis Modules (NAM) Tutorial," Cisco Systems, Inc., Version 3.5.

Cisco Systems, Inc., "Addressing Compliance from One Infrastructure: Cisco Unified Compliance Solution Framework," 2014.

(56) References Cited

OTHER PUBLICATIONS

Cisco Systems, Inc., "Cisco Application Dependency Mapping Service," 2009.
Cisco Systems, Inc., "White Paper—New Cisco Technologies Help Customers Achieve Regulatory Compliance," 1992-2008.
Cisco Systems, Inc., "A Cisco Guide to Defending Against Distributed Denial of Service Attacks," May 3, 2016, 34 pages.
Cisco Systems, Inc., "Cisco Application Visibility and Control," Oct. 2011, 2 pages.
Cisco Systems, Inc., "Cisco Tetration Platform Data Sheet", Updated Mar. 5, 2018, 21 pages.
Cisco Technology, Inc., "Cisco Lock-and-Key:Dynamic Access Lists," http://www/cisco.com/c/en/us/support/docs/security-vpn/lock-key/7604-13.html; Updated Jul. 12, 2006, 16 pages.
Di Lorenzo, Guisy, et al., "EXSED: An Intelligent Tool for Exploration of Social Events Dynamics from Augmented Trajectories," Mobile Data Management (MDM), pp. 323-330, Jun. 3-6, 2013.
Duan, Yiheng, et al., Detective: Automatically Identify and Analyze Malware Processes in Forensic Scenarios via DLLs, IEEE ICC 2015—Next Generation Networking Symposium, pp. 5691-5696.
Feinstein, Laura, et al., "Statistical Approaches to DDoS Attack Detection and Response," Proceedings of the DARPA Information Survivability Conference and Exposition (DISCEX '03), Apr. 2003, 12 pages.
George, Ashley, et al., "NetPal: A Dynamic Network Administration Knowledge Base," 2008, pp. 1-14.
Goldsteen, Abigail, et al., "A Tool for Monitoring and Maintaining System Trustworthiness at Run Time," REFSQ (2015), pp. 142-147.
Hamadi, S., et al., "Fast Path Acceleration for Open vSwitch in Overlay Networks," Global Information Infrastructure and Networking Symposium (GIIS), Montreal, QC, pp. 1-5, Sep. 15-19, 2014.
Heckman, Sarah, et al., "On Establishing a Benchmark for Evaluating Static Analysis Alert Prioritization and Classification Techniques," IEEE, 2008; 10 pages.
Hewlett-Packard, "Effective use of reputation intelligence in a security operations center," Jul. 2013, 6 pages.
Hideshima, Yusuke, et al., "STARMINE: A Visualization System for Cyber Attacks," https://www.researchgate.net/publication/221536306, Feb. 2006, 9 pages.
Huang, Hing-Jie, et al., "Clock Skew Based Node Identification in Wireless Sensor Networks," IEEE, 2008, 5 pages.
InternetPerils, Inc., "Control Your Internet Business Risk," 2003-2015, https://www.internetperils.com.
Ives, Herbert, E., et al., "An Experimental Study of the Rate of a Moving Atomic Clock," Journal of the Optical Society of America, vol. 28, No. 7, Jul. 1938, pp. 215-226.
Janoff, Christian, et al., "Cisco Compliance Solution for HIPAA Security Rule Design and Implementation Guide," Cisco Systems, Inc., Updated Nov. 14, 2015, part 1 of 2, 350 pages.
Janoff, Christian, et al., "Cisco Compliance Solution for HIPAA Security Rule Design and Implementation Guide," Cisco Systems, Inc., Updated Nov. 14, 2015, part 2 of 2, 588 pages.
Kerrison, Adam, et al., "Four Steps to Faster, Better Application Dependency Mapping—Laying the Foundation for Effective Business Service Models," BMCSoftware, 2011.
Kim, Myung-Sup, et al. "A Flow-based Method for Abnormal Network Traffic Detection, " IEEE, 2004, pp. 599-612.
Kraemer, Brian, "Get to know your data center with CMDB," TechTarget, Apr. 5, 2006, http://searchdatacenter.techtarget.com/news/118820/Get-to-know-your-data-center-with-CMDB.
Lab SKU, "VMware Hands-on Labs—HOL-SDC-1301" Version: 20140321-160709, 2013; http://docs.hol.vmware.com/HOL-2013/holsdc-1301_html_en/ (part 1 of 2).
Lab SKU, "VMware Hands-on Labs—HOL-SDC-1301" Version: 20140321-160709, 2013; http://docs.hol.vmware.com/HOL-2013/hosdc-1301_html_en/ (part 2 of 2).
Lachance, Michael, "Dirty Little Secrets of Application Dependency Mapping," Dec. 26, 2007.
Landman, Yoav, et al., "Dependency Analyzer," Feb. 14, 2008, http://jfrog.com/confluence/display/DA/Home.
Lee, Sihyung, "Reducing Complexity of Large-Scale Network Configuration Management," Ph.D. Dissertation, Carniege Mellon University, 2010.
Li, Ang, et al., "Fast Anomaly Detection for Large Data Centers," Global Telecommunications Conference (GLOBECOM 2010, Dec. 2010, 6 pages.
Li, Bingbong, et al, "A Supervised Machine Learning Approach to Classify Host Roles on Line Using sFlow," in Proceedings of the first edition workshop on High performance and programmable networking, 2013, ACM, New York, NY, USA, 53-60.
Liu, Ting, et al., "Impala: A Middleware System for Managing Autonomic, Parallel Sensor Systems," in Proceedings of the Ninth ACM SIGPLAN Symposium on Principles and Practice of Parallel Programming(PPoPP '03), ACM, New York, NY, USA, Jun. 11-13, 2003, pp. 107-118.
Lu, Zhonghai, et al., "Cluster-based Simulated Annealing for Mapping Cores onto 2D Mesh Networks on Chip," Design and Diagnostics of Electronic Circuits and Systems, pp. 1, 6, Apr. 16-18, 2008.
Matteson, Ryan, "Depmap: Dependency Mapping of Applications Using Operating System Events: a Thesis," Master's Thesis, California Polytechnic State University, Dec. 2010.
Natarajan, Arun, et al., "NSDMiner: Automated Discovery of Network Service Dependencies," Institute of Electrical and Electronics Engineers INFOCOM, Feb. 2012, 9 pages.
Navaz, A.S. Syed, et al., "Entropy based Anomaly Detection System to Prevent DDoS Attacks in Cloud," International Journal of computer Applications (0975-8887), vol. 62, No. 15, Jan. 2013, pp. 42-47.
Neverfail, "Neverfail IT Continuity Architect," 2015, https://web.archive.org/web/20150908090456/http://www.neverfailgroup.com/products/it-continuity-architect.
Nilsson, Dennis K., et al., "Key Management and Secure Software Updates in Wireless Process Control Environments," In Proceedings of the First ACM Conference on Wireless Network Security (WiSec '08), ACM, New York, NY, USA, Mar. 31-Apr. 2, 2008, pp. 100-108.
Nunnally, Troy, et al., "P3D: A Parallel 3D Coordinate Visualization for Advanced Network Scans," IEEE 2013, Jun. 9-13, 2013, 6 pages.
O'Donnell, Glenn, et al., "The CMDB Imperative: How to Realize the Dream and Avoid the Nightmares," Prentice Hall, Feb. 19, 2009.
Ohta, Kohei, et al., "Detection, Defense, and Tracking of Internet-Wide Illegal Access in a Distributed Manner," 2000, pp. 1-16.
Pathway Systems International Inc., "How Blueprints does Integration," Apr. 15, 2014, 9 pages, http://pathwaysystems.com/company-blog/.
Pathway Systems International Inc., "What is Blueprints?" 2010-2016, http://pathwaysystems.com/blueprints-about/.
Popa, Lucian, et al., "Macroscope: End-Point Approach to Networked Application Dependency Discovery," CoNEXT'09, Dec. 1-4, 2009, Rome, Italy, 12 pages.
Prasad, K. Munivara, et al., "An Efficient Detection of Flooding Attacks to Internet Threat Monitors (ITM) using Entropy Variations under Low Traffic," Computing Communication & Networking Technologies (ICCCNT '12), Jul. 26-28, 2012, 11 pages.
Sachan, Mrinmaya, et al., "Solving Electrical Networks to incorporate Supervision in Random Walks," May 13-17, 2013, pp. 109-110.
Sammarco, Matteo, et al., "Trace Selection for Improved WLAN Monitoring," Aug. 16, 2013, pp. 9-14.
Shneiderman, Ben, et al., "Network Visualization by Semantic Substrates," Visualization and Computer Graphics, vol. 12, No. 5, pp. 733,740, Sep.-Oct. 2006.
Thomas, R., "Bogon Dotted Decimal List," Version 7.0, Team Cymru NOC, Apr. 27, 2012, 5 pages.
Wang, Ru, et al., "Learning directed acyclic graphs via bootstarp aggregating," 2014, 47 pages, http://arxiv.org/abs/1406.2098.
Wang, Yongjun, et al., "A Network Gene-Based Framework for Detecting Advanced Persistent Threats," Nov. 2014, 7 pages.

(56) References Cited

OTHER PUBLICATIONS

Witze, Alexandra, "Special relativity aces time trial, 'Time dilation' predicted by Einstein confirmed by lithium ion experiment," Nature, Sep. 19, 2014, 3 pages.
Woodberg, Brad, "Snippet from Juniper SRX Series" Jun. 17, 2013, 1 page, O'Reilly Media, Inc.
Zatrochova, Zuzana, "Analysis and Testing of Distributed NoSQL Datastore Riak," Spring, 2015, 76 pages.
Zhang, Yue, et al., "CANTINA: A Content-Based Approach to Detecting Phishing Web Sites," May 8-12, 2007, pp. 639-648.
International Search Report and Written Opinion from the International Searching Authority, dated Mar. 14, 2019, 14 pages, for corresponding International Patent Application No. PCT/US19/14747.
Boschi, E., et al., "IP Flow Information Export (IPFIX) Implementation Guidelines," Apr. 1, 2008, 35 pages.
Trammel, B., et al., "Bidirectional Flow Export Using IP Flow Information Export (IPFIX)," Jan. 1, 2008, 24 pages.
Al-Fuqaha, Ala, et al., "Internet of Things: A Survey on Enabling Technologies, Protocols, and Applications," IEEE Communication Surveys & Tutorials. vol. 17, No. 4, Nov. 18, 2015, pp. 2347-2376.
Baek, Kwang-Hyun, et al., "Preventing Theft of Quality of Service on Open Platforms," 2005 Workshop of the 1st International Conference on Security and Privacy for Emerging Areas in Communication Networks, 2005, 12 pages.
Brocade Communications Systems, Inc., "Chapter 5—Configuring Virtual LANs (VLANs)," Jun. 2009, 38 pages.
Cisco Systems, Inc. "Cisco, Nexus 3000 Series NX-OS Release Notes, Release 5.0(3)U3(1)," Feb. 29, 2012, Part No. OL-26631-01, 16 pages.
Cisco Systems, Inc., "Cisco—VPN Client User Guide for Windows," Release 4.6, Aug. 2004, 148 pages.
Cisco Systems, Inc., "Cisco 4710 Application Control Engine Appliance Hardware Installation Guide," Nov. 2007, 66 pages.
Cisco Systems, Inc., "Cisco Data Center Network Architecture and Solutions Overview," Feb. 2006, 19 pages.
Cisco Systems, Inc., "Cisco IOS Configuration Fundamentals Configuration Guide: *Using Autoinstall and Setup*," Release 12.2, first published Apr. 2001, last updated Sep. 2003, 32 pages.
Cisco Systems, Inc., "Cisco VN-Link: Virtualization-Aware Networking," White Paper, Mar. 2009, 10 pages.
Cisco Systems, Inc., "Cisco, Nexus 5000 Series and Cisco Nexus 2000 Series Release Notes, Cisco NX-OS Release 5.1(3)N2(1b), NX-OS Release 5.1(3)N2(1a) and NX-OS Release 5.1(3)N2(1)," Sep. 5, 2012, Part No. OL-26652-03 CO, 24 pages.
Cisco Systems, Inc., "Nexus 3000 Series NX-OS Fundamentals Configuration Guide, Release 5.0(3)U3(1): *Using PowerOn Auto Provisioning*," Feb. 29, 2012, Part No. OL-26544-01, 10 pages.
Cisco Systems, Inc., "Quick Start Guide, Cisco ACE 4700 Series Application Control Engine Appliance," Software Ve740rsion A5(1.0), Sep. 2011, 138 pages.
Cisco Systems, Inc., "Routing and Bridging Guide, Cisco ACE Application Control Engine," Software Version A5(1.0), Sep. 2011, 248 pages.
Cisco Systems, Inc., "VMWare and Cisco Virtualization Solution: Scale Virtual Machine Networking," Jul. 2009, 4 pages.
Cisco Systems, Inc., "Cisco Remote Integrated Service Engine for Citrix NetScaler Appliances and Cisco Nexus 7000 Series Switches Configuration Guide," Last modified Apr. 29, 2014, 78 pages.
Cisco Technology, Inc., "Cisco IOS Software Release 12.4T Features and Hardware Support," Feb. 2009, 174 pages.
Cisco Systems, Inc., "Cisco Application Control Engine (ACE) Troubleshooting Guide—Understanding the ACE Module Architecture and Traffic Flow," Mar. 11, 2011, 6 pages.
Costa, Raul, et al., "An Intelligent Alarm Management System for Large-Scale Telecommunication Companies," In Portuguese Conference on Artificial Intelligence, Oct. 2009, 14 pages.
De Carvalho, Tiago Filipe Rodrigues, "Root Cause Analysis in Large and Complex Networks," Dec. 2008, Repositorio.ul.pt, pp. 1-55.
Foundation for Intelligent Physical Agents, "FIPA Agent Message Transport Service Specification," Dec. 3, 2002, http://www.fipa.org; 15 pages.
Gia, Tuan Nguyen, et al., "Fog Computing in Healthcare Internet of Things: A Case Study on ECG Feature Extraction," 2015 IEEE International Conference on Computer and Information Technology; Ubiquitous Computing and Communications; Dependable, Autonomic and Secure Computing; Pervasive Intelligence and Computing, Oct. 26, 2015, pp. 356-363.
Joseph, Dilip, et al., "Modeling Middleboxes," IEEE Network, Sep./Oct. 2008, pp. 20-25.
Kent, S., et al. "Security Architecture for the Internet Protocol," Network Working Group, Nov. 1998, 67 pages.
Online Collins English Dictionary, 1 page (Year: 2018).
Theodorakopoulos, George, et al., "On Trust Models and Trust Evaluation Metrics for Ad Hoc Networks," IEEE Journal on Selected Areas in Communications. vol. 24, Issue 2, Feb. 2006, pp. 318-328.
Voris, Jonathan, et al., "Bait and Snitch: Defending Computer Systems with Decoys," Columbia University Libraries, Department of Computer Science, 2013, pp. 1-25.
Zeng, Sai, et al., "Managing Risk in Multi-node Automation of Endpoint Management," 2014 IEEE Network Operations and Management Symposium (NOMS), 2014, 6 pages.

\* cited by examiner

INTERFACES
602

CPU 604

MEMORY
606

PROCESSOR
608

610

NETWORK FLOW STITCHING USING MIDDLE BOX FLOW STITCHING

CROSS-REFERENCE TO RELATED APPLICATIONS

This application claims priority to U.S. Provisional Patent Application No. 62/621,925, filed on Jan. 25, 2018, entitled "Network Flow Stitching Using Middle Box Flow Sensing," the content of which is incorporated herein by reference in its entirety.

TECHNICAL FIELD

The present technology pertains to network traffic flow stitching and flow stitching network traffic flow segments at a middlebox in a network environment.

BACKGROUND

Currently, sensors deployed in a network can be used to gather network traffic data related to nodes operating in the network. The network traffic data can include metadata relating to a packet, a collection of packets, a flow, a bidirectional flow, a group of flows, a session, or a network communication of another granularity. That is, the network traffic data can generally include any information describing communication on all layers of the Open Systems Interconnection (OSI) model. For example, the network traffic data can include source/destination MAC address, source/destination IP address, protocol, port number, etc. In some embodiments, the network traffic data can also include summaries of network activity or other network statistics such as number of packets, number of bytes, number of flows, bandwidth usage, response time, latency, packet loss, jitter, and other network statistics.

Gathered network traffic data can be analyzed to provide insights into the operation of the nodes in the network, otherwise referred to as analytics. In particular, discovered application or inventories, application dependencies, policies, efficiencies, resource and bandwidth usage, and network flows can be determined for the network using the network traffic data.

Sensors deployed in a network can be used to gather network traffic data on a client and server level of granularity. For example, network traffic data can be gathered for determining which clients are communicating which servers and vice versa. However, sensors are not currently deployed or integrated with systems to gather network traffic data for different segments of traffic flows forming the traffic flows between a server and a client. Specifically, current sensors gather network traffic data as traffic flows directly between a client and a server while ignoring which nodes, e.g. middleboxes, the traffic flows actually pass through in passing between a server and a client. This effectively treats the network environment between servers and clients as a black box and leads to gaps in network traffic data and traffic flows indicated by the network traffic data.

In turn, such gaps in network traffic data and corresponding traffic flows can lead to deficiencies in diagnosing problems within a network environment. For example, a problem stemming from an incorrectly configured middlebox might be diagnosed as occurring at a client as the flow between the client and a server is treated as a black box. In another example, gaps in network traffic data between a server and a client can lead to an inability to determine whether policies are correctly enforced at a middlebox between the server and the client. There therefore exist needs for systems, methods, and computer-readable media for generating network traffic data at nodes between servers and clients, e.g. at middleboxes between the servers and clients. In particular, there exist needs for systems, methods, and computer-readable media for stitching together traffic flows at nodes between servers and clients to generate a more complete and detailed traffic flow, e.g. between the servers and the clients.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
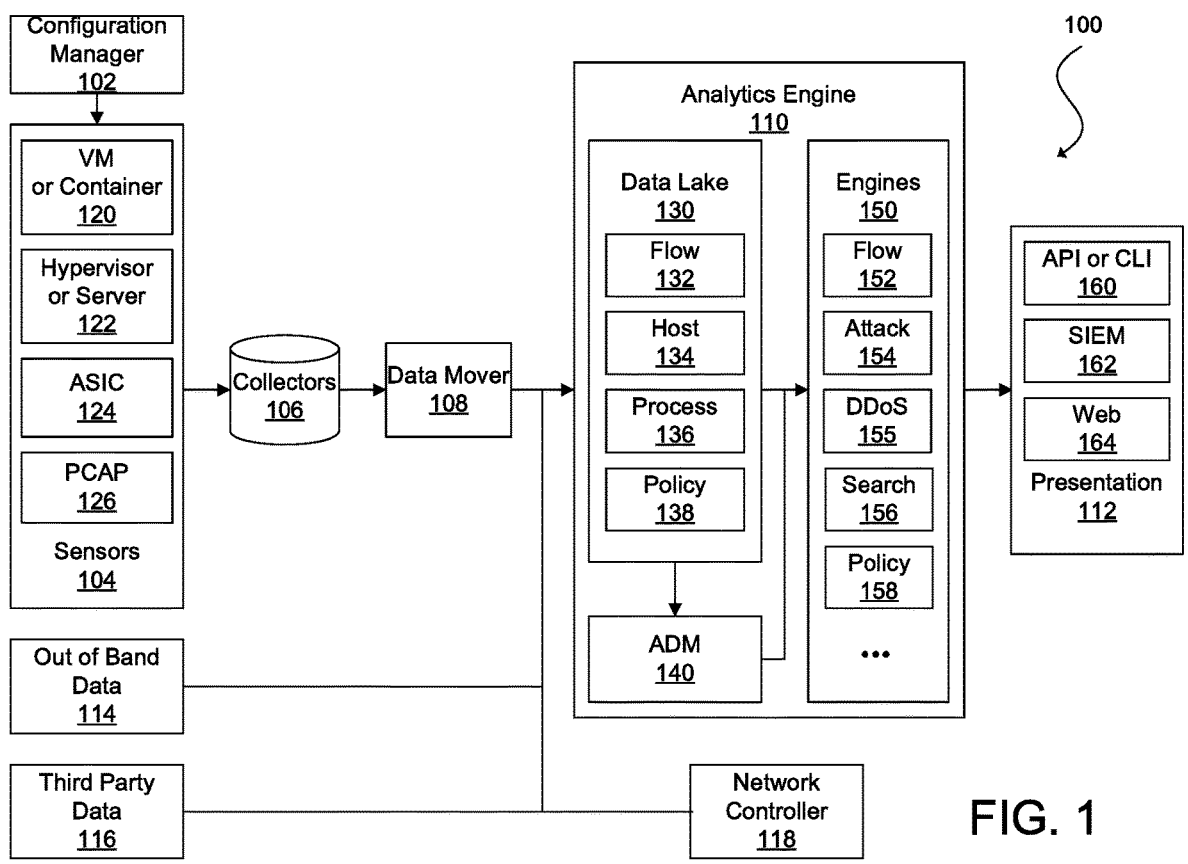
FIG. 1 illustrates an example network traffic monitoring system.

Various embodiments of the disclosure are discussed in detail below. While specific implementations are discussed, it should be understood that this is done for illustration purposes only. A person skilled in the relevant art will recognize that other components and configurations can be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which can be exhibited by some embodiments and not by others.

The terms used in this specification generally have their ordinary meanings in the art, within the context of the disclosure, and in the specific context where each term is used. Alternative language and synonyms can be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles can be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

A method can include collecting flow records of traffic flow segments at a middlebox in a network environment corresponding to one or more traffic flows passing through the middlebox. The flow records can include one or more transaction identifiers assigned to the traffic flow segments. The method can include identifying flow directions of the traffic flow segments in the network environment with respect to the middlebox using the flow records. Further, the traffic flow segments can be stitched together based on the one or more transaction identifiers assigned to the traffic flow segments and the flow directions of the traffic flow segments in the network environment with respect to the middlebox. Specifically, the traffic flow segments can be stitched together to form a stitched traffic flow of the one or more traffic flows passing through the middlebox in the network environment. The method can also include incorporating the stitched traffic flow as part of network traffic data for the network environment.

A system can collect flow records of traffic flow segments at a middblebox in a network environment corresponding to one or more traffic flows passing between a client and a server directly through the middlebox. The flow records can include one or more transaction identifiers assigned to the traffic flow segments. The system can identify flow directions of the traffic flow segments in the network environment with respect to the middlebox using the flow records. Further, the system can stitch together the traffic flow segments together based on the one or more transaction identifiers assigned to the traffic flow segments and the flow directions of the traffic flow segments in the network environment with respect to the middlebox. Specifically, the traffic flow segments can be stitched together to form a stitched traffic flow of the one or more traffic flows passing through the middlebox in the network environment. The system can incorporate the stitched traffic flow as part of network traffic data for the network environment.

A system can collect flow records of traffic flow segments at a middlebox in a network environment corresponding to one or more traffic flows passing through the middlebox. The flow records can include one or more transaction identifiers assigned to the traffic flow segments. The system can identify flow directions of the traffic flow segments in the network environment with respect to the middlebox using the flow records. Further, the system can stitch together the traffic flow segments together based on the one or more transaction identifiers assigned to the traffic flow segments and the flow directions of the traffic flow segments in the network environment with respect to the middlebox. Specifically, the traffic flow segments can be stitched together to form a stitched traffic flow of the one or more traffic flows passing through the middlebox in the network environment. The system can incorporate the stitched traffic flows as part of an application dependency mapping included as part of network traffic data for the network environment.

Example Embodiments

The disclosed technology addresses the need in the art for monitoring network environments, e.g. to diagnose and prevent problems in the network environment. The present technology involves system, methods, and computer-readable media for stitching together traffic flows at nodes between servers and clients to provide more detailed network traffic data, e.g. for diagnosing and preventing problems in a network environment.

Figure 2:
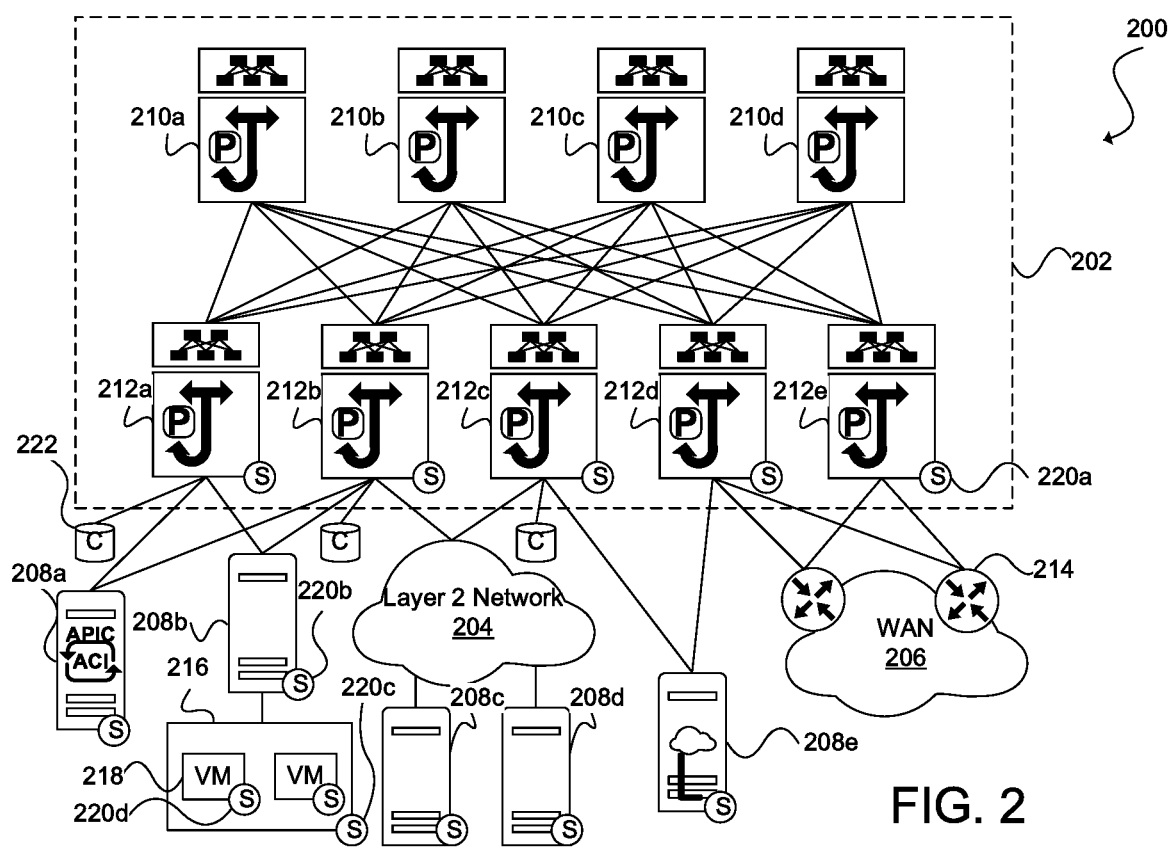
FIG. 2 illustrates an example of a network environment.
Figure 3:
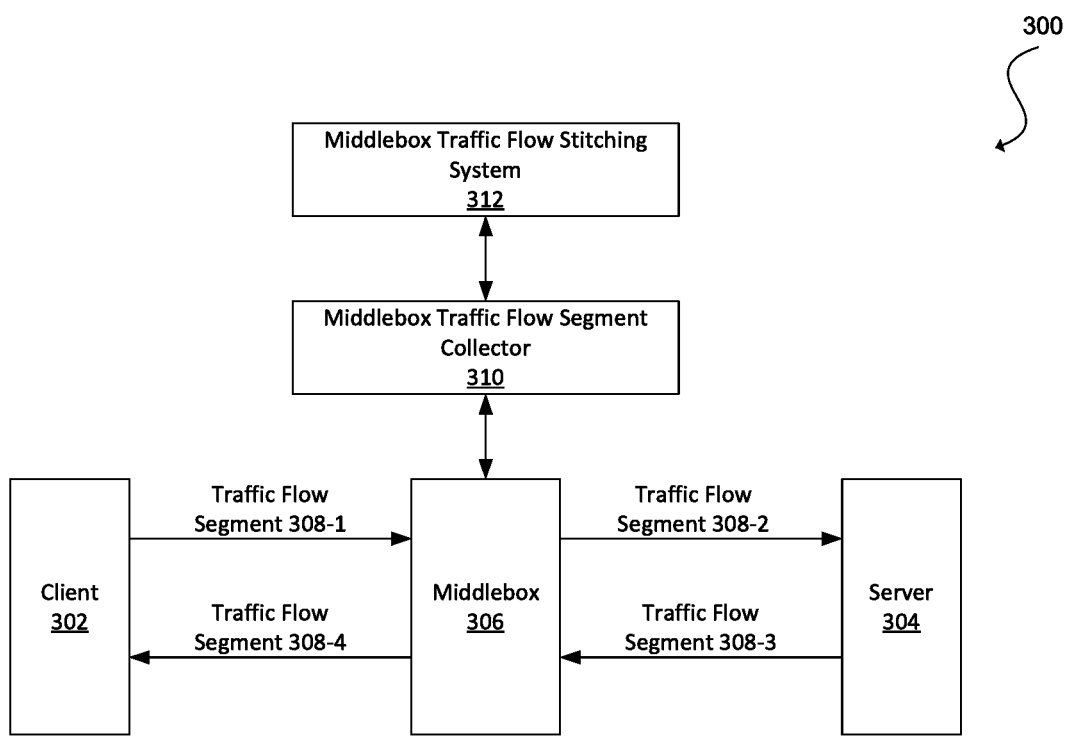
FIG. 3 depicts a diagram of an example network environment for stitching together traffic flow segments between a client and a serve.
Figure 4:
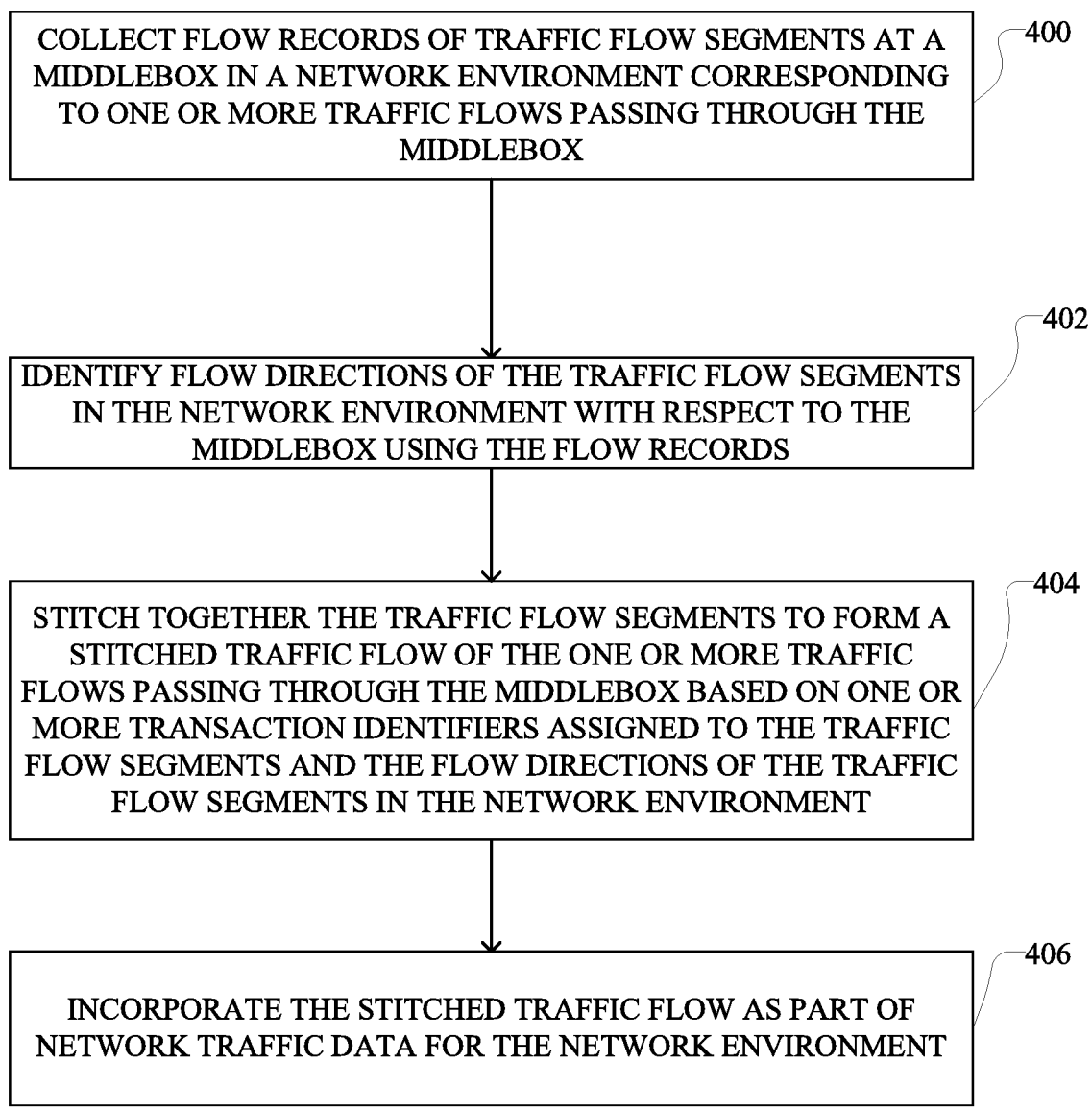
FIG. 4 illustrates a flowchart for an example method of stitching traffic flows passing through a middlebox.
Figure 5:
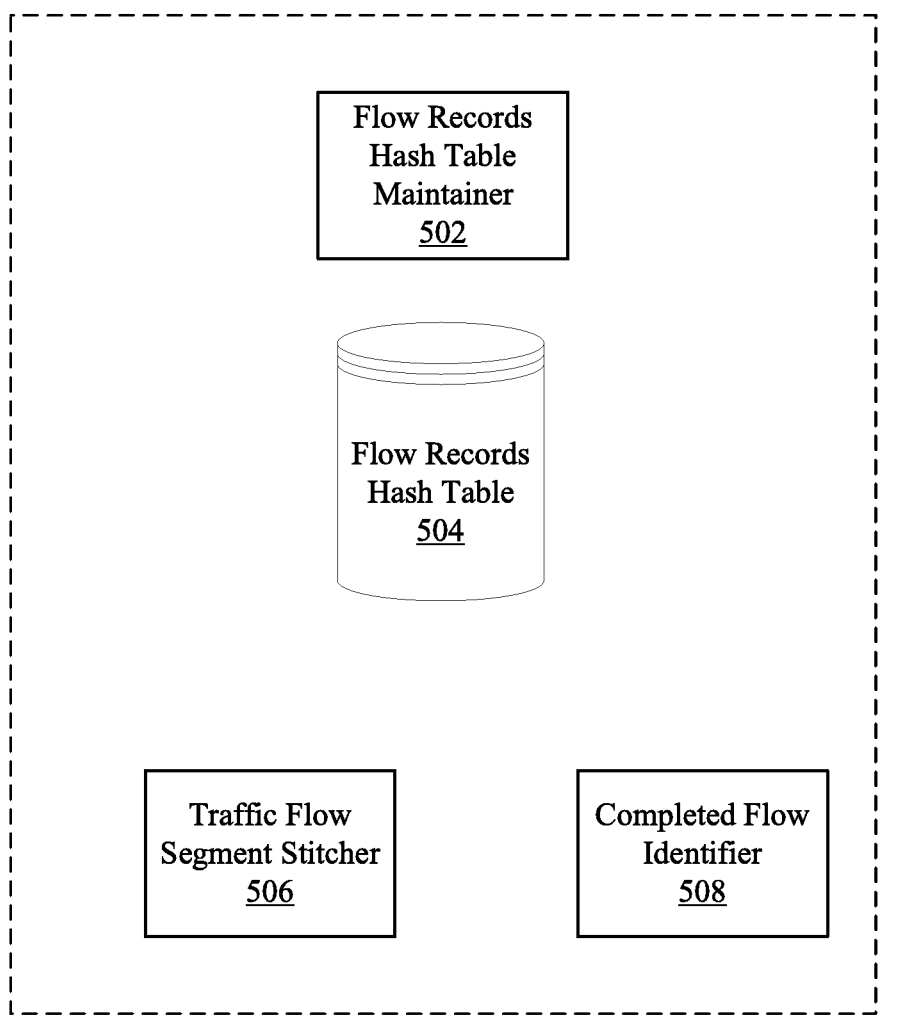
FIG. 5 shows an example middlebox traffic flow stitching system.
Figure 6:
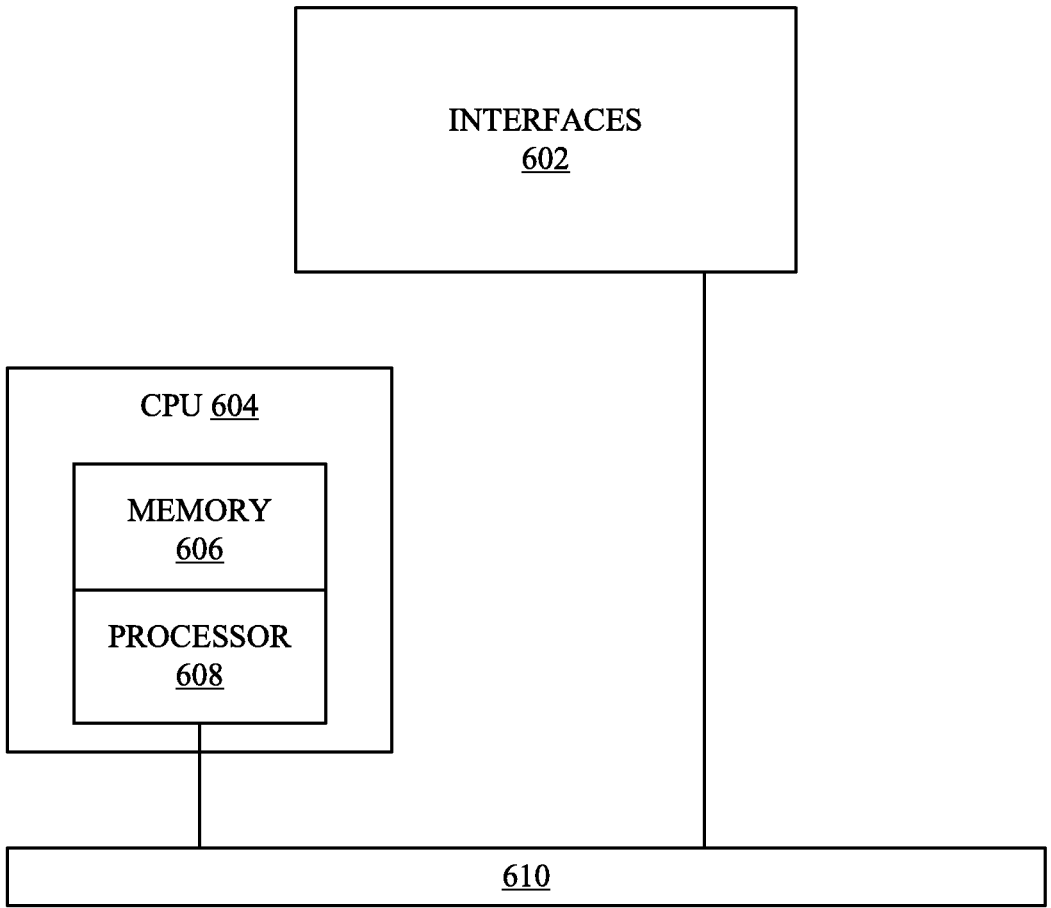
FIG. 6 illustrates an example network device in accordance with various embodiments.
Figure 7:
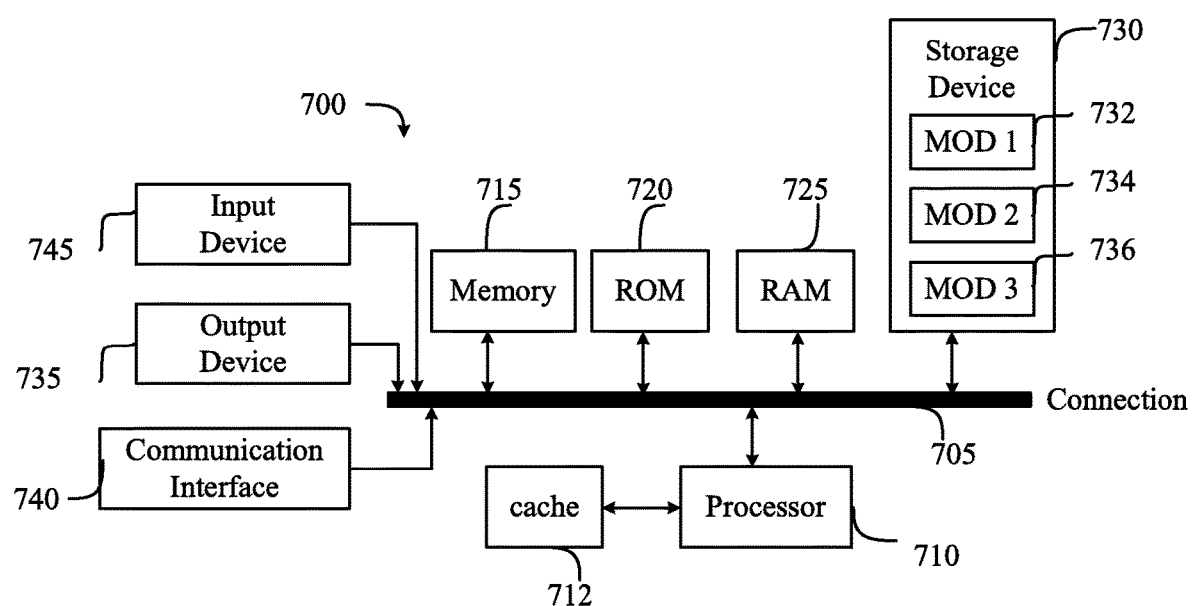
FIG. 7 illustrates an example computing device in accordance with various embodiments.

The present technology will be described in the following disclosure as follows. The discussion begins with an introductory discussion of network traffic data collection and a description of an example network traffic monitoring system and an example network environment, as shown in FIGS. 1 and 2. A discussion of example systems and methods for stitching together network traffic flows, as shown in FIGS. 3-5, will then follow. A discussion of example network devices and computing devices, as illustrated in FIGS. 6 and 7, will then follow. The disclosure now turns to an introductory discussion of network sensor data collection based on network traffic flows and clustering of nodes in a network for purposes of collecting data based on network traffic flows.

Sensors implemented in networks are traditionally limited to collecting packet data at networking devices. In some embodiments, networks can be configured with sensors at multiple points, including on networking devices (e.g., switches, routers, gateways, firewalls, deep packet inspectors, traffic monitors, load balancers, etc.), physical servers, hypervisors or shared kernels, virtual partitions (e.g., VMs or containers), and other network elements. This can provide a more comprehensive view of the network. Further, network traffic data (e.g., flows) can be associated with, or otherwise include, host and/or endpoint data (e.g., host/endpoint name, operating system, CPU usage, network usage, disk space, logged users, scheduled jobs, open files, information regarding files stored on a host/endpoint, etc.), process data (e.g., process name, ID, parent process ID, path, CPU utilization, memory utilization, etc.), user data (e.g., user name, ID, login time, etc.), and other collectible data to provide more insight into network activity.

Sensors implemented in a network at multiple points can be used to collect data for nodes grouped together into a cluster. Nodes can be clustered together, or otherwise a cluster of nodes can be identified using one or a combination of applicable network operation factors. For example, endpoints performing similar workloads, communicating with a similar set of endpoints or networking devices, having similar network and security limitations (i.e., policies), and sharing other attributes can be clustered together.

In some embodiments, a cluster can be determined based on early fusion in which feature vectors of each node comprise the union of individual feature vectors across multiple domains. For example, a feature vector can include a packet header-based feature (e.g., destination network address for a flow, port, etc.) concatenated to an aggregate flow-based feature (e.g., the number of packets in the flow, the number of bytes in the flow, etc.). A cluster can then be defined as a set of nodes whose respective concatenated feature vectors are determined to exceed specified similarity thresholds (or fall below specified distance thresholds).

In some embodiments, a cluster can be defined based on late fusion in which each node can be represented as multiple feature vectors of different data types or domains. In such systems, a cluster can be a set of nodes whose similarity (and/or distance measures) across different domains, satisfy specified similarity (and/or distance) conditions for each domain. For example, a first node can be defined by a first network information-based feature vector and a first process-based feature vector while a second node can be defined by a second network information-based feature vector and a second process-based feature vector. The nodes can be determined to form a cluster if their corresponding network-based feature vectors are similar to a specified degree and their corresponding process-based feature vectors are only a specified distance apart.

Referring now to the drawings, FIG. 1 is an illustration of a network traffic monitoring system 100 in accordance with an embodiment. The network traffic monitoring system 100 can include a configuration manager 102, sensors 104, a collector module 106, a data mover module 108, an analytics engine 110, and a presentation module 112. In FIG. 1, the analytics engine 110 is also shown in communication with out-of-band data sources 114, third party data sources 116, and a network controller 118.

The configuration manager 102 can be used to provision and maintain the sensors 104, including installing sensor software or firmware in various nodes of a network, configuring the sensors 104, updating the sensor software or firmware, among other sensor management tasks. For example, the sensors 104 can be implemented as virtual partition images (e.g., virtual machine (VM) images or container images), and the configuration manager 102 can distribute the images to host machines. In general, a virtual partition can be an instance of a VM, container, sandbox, or other isolated software environment. The software environment can include an operating system and application software. For software running within a virtual partition, the virtual partition can appear to be, for example, one of many servers or one of many operating systems executed on a single physical server. The configuration manager 102 can instantiate a new virtual partition or migrate an existing partition to a different physical server. The configuration manager 102 can also be used to configure the new or migrated sensor.

The configuration manager 102 can monitor the health of the sensors 104. For example, the configuration manager 102 can request for status updates and/or receive heartbeat messages, initiate performance tests, generate health checks, and perform other health monitoring tasks. In some embodiments, the configuration manager 102 can also authenticate the sensors 104. For instance, the sensors 104 can be assigned a unique identifier, such as by using a one-way hash function of a sensor's basic input/out system (BIOS) universally unique identifier (UUID) and a secret key stored by the configuration image manager 102. The UUID can be a large number that can be difficult for a malicious sensor or other device or component to guess. In some embodiments, the configuration manager 102 can keep the sensors 104 up to date by installing the latest versions of sensor software and/or applying patches. The configuration manager 102 can obtain these updates automatically from a local source or the Internet.

The sensors 104 can reside on various nodes of a network, such as a virtual partition (e.g., VM or container) 120; a hypervisor or shared kernel managing one or more virtual partitions and/or physical servers 122, an application-specific integrated circuit (ASIC) 124 of a switch, router, gateway, or other networking device, or a packet capture (pcap) 126 appliance (e.g., a standalone packet monitor, a device connected to a network devices monitoring port, a device connected in series along a main trunk of a datacenter, or similar device), or other element of a network. The sensors 104 can monitor network traffic between nodes, and send network traffic data and corresponding data (e.g., host data, process data, user data, etc.) to the collectors 106 for storage. For example, the sensors 104 can sniff packets being sent over its hosts' physical or virtual network interface card (NIC), or individual processes can be configured to report network traffic and corresponding data to the sensors 104. Incorporating the sensors 104 on multiple nodes and within multiple partitions of some nodes of the network can provide for robust capture of network traffic and corresponding data from each hop of data transmission. In some embodiments, each node of the network (e.g., VM, container, or other virtual partition 120, hypervisor, shared kernel, or physical server 122, ASIC 124, pcap 126, etc.) includes a respective sensor 104. However, it should be understood that various software and hardware configurations can be used to implement the sensor network 104.

As the sensors 104 capture communications and corresponding data, they can continuously send network traffic data to the collectors 106. The network traffic data can include metadata relating to a packet, a collection of packets, a flow, a bidirectional flow, a group of flows, a session, or a network communication of another granularity. That is, the network traffic data can generally include any information describing communication on all layers of the Open Systems Interconnection (OSI) model. For example, the network traffic data can include source/destination MAC address, source/destination IP address, protocol, port number, etc. In some embodiments, the network traffic data can also include summaries of network activity or other network statistics such as number of packets, number of bytes, number of flows, bandwidth usage, response time, latency, packet loss, jitter, and other network statistics.

The sensors 104 can also determine additional data, included as part of gathered network traffic data, for each session, bidirectional flow, flow, packet, or other more granular or less granular network communication. The additional data can include host and/or endpoint information, virtual partition information, sensor information, process information, user information, tenant information, application information, network topology, application dependency mapping, cluster information, or other information corresponding to each flow.

In some embodiments, the sensors 104 can perform some preprocessing of the network traffic and corresponding data before sending the data to the collectors 106. For example, the sensors 104 can remove extraneous or duplicative data or they can create summaries of the data (e.g., latency, number of packets per flow, number of bytes per flow, number of flows, etc.). In some embodiments, the sensors 104 can be configured to only capture certain types of network information and disregard the rest. In some embodiments, the sensors 104 can be configured to capture only a representative sample of packets (e.g., every 1,000th packet or other suitable sample rate) and corresponding data.

Since the sensors 104 can be located throughout the network, network traffic and corresponding data can be collected from multiple vantage points or multiple perspectives in the network to provide a more comprehensive view of network behavior. The capture of network traffic and corresponding data from multiple perspectives rather than just at a single sensor located in the data path or in communication with a component in the data path, allows the data to be correlated from the various data sources, which can be used as additional data points by the analytics engine 110. Further, collecting network traffic and corresponding data from multiple points of view ensures more accurate data is captured. For example, a conventional sensor network can be limited to sensors running on external-facing network devices (e.g., routers, switches, network appliances, etc.) such that east-west traffic, including VM-to-VM or container-to-container traffic on a same host, may not be monitored. In addition, packets that are dropped before traversing a network device or packets containing errors cannot be accurately monitored by the conventional sensor network. The sensor network 104 of various embodiments substantially mitigates or eliminates these issues altogether by locating sensors at multiple points of potential failure. Moreover, the network traffic monitoring system 100 can verify multiple instances of data for a flow (e.g., source endpoint flow data, network device flow data, and endpoint flow data) against one another.

In some embodiments, the network traffic monitoring system 100 can assess a degree of accuracy of flow data sets from multiple sensors and utilize a flow data set from a single sensor determined to be the most accurate and/or complete. The degree of accuracy can be based on factors such as network topology (e.g., a sensor closer to the source can be more likely to be more accurate than a sensor closer to the destination), a state of a sensor or a node hosting the sensor (e.g., a compromised sensor/node can have less accurate flow data than an uncompromised sensor/node), or flow data volume (e.g., a sensor capturing a greater number of packets for a flow can be more accurate than a sensor capturing a smaller number of packets).

In some embodiments, the network traffic monitoring system 100 can assemble the most accurate flow data set and corresponding data from multiple sensors. For instance, a first sensor along a data path can capture data for a first packet of a flow but can be missing data for a second packet of the flow while the situation is reversed for a second sensor along the data path. The network traffic monitoring system 100 can assemble data for the flow from the first packet captured by the first sensor and the second packet captured by the second sensor.

As discussed, the sensors 104 can send network traffic and corresponding data to the collectors 106. In some embodiments, each sensor can be assigned to a primary collector and a secondary collector as part of a high availability scheme. If the primary collector fails or communications between the sensor and the primary collector are not otherwise possible, a sensor can send its network traffic and corresponding data to the secondary collector. In other embodiments, the sensors 104 are not assigned specific collectors but the network traffic monitoring system 100 can determine an optimal collector for receiving the network traffic and corresponding data through a discovery process. In such embodiments, a sensor can change where it sends it network traffic and corresponding data if its environments changes, such as if a default collector fails or if the sensor is migrated to a new location and it would be optimal for the sensor to send its data to a different collector. For example, it can be preferable for the sensor to send its network traffic and corresponding data on a particular path and/or to a particular collector based on latency, shortest path, monetary cost (e.g., using private resources versus a public resources provided by a public cloud provider), error rate, or some combination of these factors. In other embodiments, a sensor can send different types of network traffic and corresponding data to different collectors. For example, the sensor can send first network traffic and corresponding data related to one type of process to one collector and second network traffic and corresponding data related to another type of process to another collector.

The collectors 106 can be any type of storage medium that can serve as a repository for the network traffic and corresponding data captured by the sensors 104. In some embodiments, data storage for the collectors 106 is located in an in-memory database, such as dashDB from IBM®, although it should be appreciated that the data storage for the collectors 106 can be any software and/or hardware capable of providing rapid random access speeds typically used for analytics software. In various embodiments, the collectors 106 can utilize solid state drives, disk drives, magnetic tape drives, or a combination of the foregoing according to cost, responsiveness, and size requirements. Further, the collectors 106 can utilize various database structures such as a normalized relational database or a NoSQL database, among others.

In some embodiments, the collectors 106 can only serve as network storage for the network traffic monitoring system 100. In such embodiments, the network traffic monitoring system 100 can include a data mover module 108 for retrieving data from the collectors 106 and making the data available to network clients, such as the components of the analytics engine 110. In effect, the data mover module 108 can serve as a gateway for presenting network-attached storage to the network clients. In other embodiments, the collectors 106 can perform additional functions, such as organizing, summarizing, and preprocessing data. For example, the collectors 106 can tabulate how often packets of certain sizes or types are transmitted from different nodes of the network. The collectors 106 can also characterize the traffic flows going to and from various nodes. In some embodiments, the collectors 106 can match packets based on sequence numbers, thus identifying traffic flows and connection links. As it can be inefficient to retain all data indefinitely in certain circumstances, in some embodiments, the collectors 106 can periodically replace detailed network traffic data with consolidated summaries. In this manner, the collectors 106 can retain a complete dataset describing one period (e.g., the past minute or other suitable period of time), with a smaller dataset of another period (e.g., the previous 2-10 minutes or other suitable period of time), and progressively consolidate network traffic and corresponding data of other periods of time (e.g., day, week, month, year, etc.). In some embodiments, network traffic and corresponding data for a set of flows identified as normal or routine can be winnowed at an earlier period of time while a more complete data set can be retained for a lengthier period of time for another set of flows identified as anomalous or as an attack.

The analytics engine 110 can generate analytics using data collected by the sensors 104. Analytics generated by the analytics engine 110 can include applicable analytics of nodes or a cluster of nodes operating in a network. For example, analytics generated by the analytics engine 110 can include one or a combination of information related to flows of data through nodes, detected attacks on a network or nodes of a network, applications at nodes or distributed across the nodes, application dependency mappings for applications at nodes, policies implemented at nodes, and actual policies enforced at nodes.

Computer networks can be exposed to a variety of different attacks that expose vulnerabilities of computer systems in order to compromise their security. Some network traffic can be associated with malicious programs or devices. The analytics engine 110 can be provided with examples of network states corresponding to an attack and network states corresponding to normal operation. The analytics engine 110 can then analyze network traffic and corresponding data to recognize when the network is under attack. In some embodiments, the network can operate within a trusted environment for a period of time so that the analytics engine 110 can establish a baseline of normal operation. Since malware is constantly evolving and changing, machine learning can be used to dynamically update models for identifying malicious traffic patterns.

In some embodiments, the analytics engine 110 can be used to identify observations which differ from other examples in a dataset. For example, if a training set of example data with known outlier labels exists, supervised anomaly detection techniques can be used. Supervised anomaly detection techniques utilize data sets that have been labeled as normal and abnormal and train a classifier. In a case in which it is unknown whether examples in the training data are outliers, unsupervised anomaly techniques can be used. Unsupervised anomaly detection techniques can be used to detect anomalies in an unlabeled test data set under the assumption that the majority of instances in the data set are normal by looking for instances that seem to fit to the remainder of the data set.

The analytics engine 110 can include a data lake 130, an application dependency mapping (ADM) module 140, and elastic processing engines 150. The data lake 130 is a large-scale storage repository that provides massive storage for various types of data, enormous processing power, and the ability to handle nearly limitless concurrent tasks or jobs. In some embodiments, the data lake 130 is implemented using the Hadoop® Distributed File System (HDFS™) from Apache® Software Foundation of Forest Hill, Md. HDFS™ is a highly scalable and distributed file system that can scale to thousands of cluster nodes, millions of files, and petabytes of data. HDFS™ is optimized for batch processing where data locations are exposed to allow computations to take place where the data resides. HDFS™ provides a single namespace for an entire cluster to allow for data coherency in a write-once, read-many access model. That is, clients can only append to existing files in the node. In HDFS™, files are separated into blocks, which are typically 64 MB in size and are replicated in multiple data nodes. Clients access data directly from data nodes.

In some embodiments, the data mover 108 receives raw network traffic and corresponding data from the collectors 106 and distributes or pushes the data to the data lake 130. The data lake 130 can also receive and store out-of-band data 114, such as statuses on power levels, network availability, server performance, temperature conditions, cage door positions, and other data from internal sources, and third party data 116, such as security reports (e.g., provided by Cisco® Systems, Inc. of San Jose, Calif., Arbor Networks® of Burlington, Mass., Symantec® Corp. of Sunnyvale, Calif., Sophos® Group plc of Abingdon, England, Microsoft® Corp. of Seattle, Wash., Verizon® Communications, Inc. of New York, N.Y., among others), geolocation data, IP watch lists, Whois data, configuration management database (CMDB) or configuration management system (CMS) as a service, and other data from external sources. In other embodiments, the data lake 130 can instead fetch or pull raw traffic and corresponding data from the collectors 106 and relevant data from the out-of-band data sources 114 and the third party data sources 116. In yet other embodiments, the functionality of the collectors 106, the data mover 108, the out-of-band data sources 114, the third party data sources 116, and the data lake 130 can be combined. Various combinations and configurations are possible as would be known to one of ordinary skill in the art.

Each component of the data lake 130 can perform certain processing of the raw network traffic data and/or other data (e.g., host data, process data, user data, out-of-band data or third party data) to transform the raw data to a form useable by the elastic processing engines 150. In some embodiments, the data lake 130 can include repositories for flow attributes 132, host and/or endpoint attributes 134, process attributes 136, and policy attributes 138. In some embodiments, the data lake 130 can also include repositories for VM or container attributes, application attributes, tenant attributes, network topology, application dependency maps, cluster attributes, etc.

The flow attributes 132 relate to information about flows traversing the network. A flow is generally one or more packets sharing certain attributes that are sent within a network within a specified period of time. The flow attributes 132 can include packet header fields such as a source address (e.g., Internet Protocol (IP) address, Media Access Control (MAC) address, Domain Name System (DNS) name, or other network address), source port, destination address, destination port, protocol type, class of service, among other fields. The source address can correspond to a first endpoint (e.g., network device, physical server, virtual partition, etc.) of the network, and the destination address can correspond to a second endpoint, a multicast group, or a broadcast domain. The flow attributes 132 can also include aggregate packet data such as flow start time, flow end time, number of packets for a flow, number of bytes for a flow, the union of TCP flags for a flow, among other flow data.

The host and/or endpoint attributes 134 describe host and/or endpoint data for each flow, and can include host and/or endpoint name, network address, operating system, CPU usage, network usage, disk space, ports, logged users, scheduled jobs, open files, and information regarding files and/or directories stored on a host and/or endpoint (e.g., presence, absence, or modifications of log files, configuration files, device special files, or protected electronic information). As discussed, in some embodiments, the host and/or endpoints attributes 134 can also include the out-ofband data 114 regarding hosts such as power level, temperature, and physical location (e.g., room, row, rack, cage door position, etc.) or the third party data 116 such as whether a host and/or endpoint is on an IP watch list or otherwise associated with a security threat, Whois data, or geocoordinates. In some embodiments, the out-of-band data 114 and the third party data 116 can be associated by process, user, flow, or other more granular or less granular network element or network communication.

The process attributes 136 relate to process data corresponding to each flow, and can include process name (e.g., bash, httpd, netstat, etc.), ID, parent process ID, path (e.g., /usr2/username/bin/, /usr/local/bin, /usr/bin, etc.), CPU utilization, memory utilization, memory address, scheduling information, nice value, flags, priority, status, start time, terminal type, CPU time taken by the process, the command that started the process, and information regarding a process owner (e.g., user name, ID, user's real name, e-mail address, user's groups, terminal information, login time, expiration date of login, idle time, and information regarding files and/or directories of the user).

The policy attributes 138 contain information relating to network policies. Policies establish whether a particular flow is allowed or denied by the network as well as a specific route by which a packet traverses the network. Policies can also be used to mark packets so that certain kinds of traffic receive differentiated service when used in combination with queuing techniques such as those based on priority, fairness, weighted fairness, token bucket, random early detection, round robin, among others. The policy attributes 138 can include policy statistics such as a number of times a policy was enforced or a number of times a policy was not enforced. The policy attributes 138 can also include associations with network traffic data. For example, flows found to be non-conformant can be linked or tagged with corresponding policies to assist in the investigation of non-conformance.

The analytics engine 110 can include any number of engines 150, including for example, a flow engine 152 for identifying flows (e.g., flow engine 152) or an attacks engine 154 for identify attacks to the network. In some embodiments, the analytics engine can include a separate distributed denial of service (DDoS) attack engine 155 for specifically detecting DDoS attacks. In other embodiments, a DDoS attack engine can be a component or a sub-engine of a general attacks engine. In some embodiments, the attacks engine 154 and/or the DDoS engine 155 can use machine learning techniques to identify security threats to a network. For example, the attacks engine 154 and/or the DDoS engine 155 can be provided with examples of network states corresponding to an attack and network states corresponding to normal operation. The attacks engine 154 and/or the DDoS engine 155 can then analyze network traffic data to recognize when the network is under attack. In some embodiments, the network can operate within a trusted environment for a time to establish a baseline for normal network operation for the attacks engine 154 and/or the DDoS.

The analytics engine 110 can further include a search engine 156. The search engine 156 can be configured, for example to perform a structured search, an NLP (Natural Language Processing) search, or a visual search. Data can be provided to the engines from one or more processing components.

The analytics engine 110 can also include a policy engine 158 that manages network policy, including creating and/or importing policies, monitoring policy conformance and non-conformance, enforcing policy, simulating changes to policy or network elements affecting policy, among other policy-related tasks.

The ADM module 140 can determine dependencies of applications of the network. That is, particular patterns of traffic can correspond to an application, and the interconnectivity or dependencies of the application can be mapped to generate a graph for the application (i.e., an application dependency mapping). In this context, an application refers to a set of networking components that provides connectivity for a given set of workloads. For example, in a conventional three-tier architecture for a web application, first endpoints of the web tier, second endpoints of the application tier, and third endpoints of the data tier make up the web application. The ADM module 140 can receive input data from various repositories of the data lake 130 (e.g., the flow attributes 132, the host and/or endpoint attributes 134, the process attributes 136, etc.). The ADM module 140 can analyze the input data to determine that there is first traffic flowing between external endpoints on port 80 of the first endpoints corresponding to Hypertext Transfer Protocol (HTTP) requests and responses. The input data can also indicate second traffic between first ports of the first endpoints and second ports of the second endpoints corresponding to application server requests and responses and third traffic flowing between third ports of the second endpoints and fourth ports of the third endpoints corresponding to database requests and responses. The ADM module 140 can define an ADM for the web application as a three-tier application including a first EPG comprising the first endpoints, a second EPG comprising the second endpoints, and a third EPG comprising the third endpoints.

The presentation module 112 can include an application programming interface (API) or command line interface (CLI) 160, a security information and event management (STEM) interface 162, and a web front-end 164. As the analytics engine 110 processes network traffic and corresponding data and generates analytics data, the analytics data may not be in a human-readable form or it can be too voluminous for a user to navigate. The presentation module 112 can take the analytics data generated by analytics engine 110 and further summarize, filter, and organize the analytics data as well as create intuitive presentations for the analytics data.

In some embodiments, the API or CLI 160 can be implemented using Hadoop® Hive from Apache® for the back end, and Java® Database Connectivity (JDBC) from Oracle® Corporation of Redwood Shores, Calif., as an API layer. Hive is a data warehouse infrastructure that provides data summarization and ad hoc querying. Hive provides a mechanism to query data using a variation of structured query language (SQL) that is called HiveQL. JDBC is an API for the programming language Java®, which defines how a client can access a database.

In some embodiments, the SIEM interface 162 can be implemented using Hadoop® Kafka for the back end, and software provided by Splunk®, Inc. of San Francisco, Calif. as the SIEM platform. Kafka is a distributed messaging system that is partitioned and replicated. Kafka uses the concept of topics. Topics are feeds of messages in specific categories. In some embodiments, Kafka can take raw packet captures and telemetry information from the data mover 108 as input, and output messages to a SIEM platform, such as Splunk®. The Splunk® platform is utilized for searching, monitoring, and analyzing machine-generated data.

In some embodiments, the web front-end 164 can be implemented using software provided by MongoDB®, Inc. of New York, N.Y. and Hadoop® ElasticSearch from Apache® for the back-end, and Ruby on Rails™ as the web application framework. MongoDB® is a document-oriented NoSQL database based on documents in the form of JavaScript® Object Notation (JSON) with dynamic schemas. ElasticSearch is a scalable and real-time search and analytics engine that provides domain-specific language (DSL) full querying based on JSON. Ruby on Rails™ is model-view-controller (MVC) framework that provides default structures for a database, a web service, and web pages. Ruby on Rails™ relies on web standards such as JSON or extensible markup language (XML) for data transfer, and hypertext markup language (HTML), cascading style sheets, (CSS), and JavaScript® for display and user interfacing.

Although FIG. 1 illustrates an example configuration of the various components of a network traffic monitoring system, those of skill in the art will understand that the components of the network traffic monitoring system 100 or any system described herein can be configured in a number of different ways and can include any other type and number of components. For example, the sensors 104, the collectors 106, the data mover 108, and the data lake 130 can belong to one hardware and/or software module or multiple separate modules. Other modules can also be combined into fewer components and/or further divided into more components.

FIG. 2 illustrates an example of a network environment 200 in accordance with an embodiment. In some embodiments, a network traffic monitoring system, such as the network traffic monitoring system 100 of FIG. 1, can be implemented in the network environment 200. It should be understood that, for the network environment 200 and any environment discussed herein, there can be additional or fewer nodes, devices, links, networks, or components in similar or alternative configurations. Embodiments with different numbers and/or types of clients, networks, nodes, cloud components, servers, software components, devices, virtual or physical resources, configurations, topologies, services, appliances, deployments, or network devices are also contemplated herein. Further, the network environment 200 can include any number or type of resources, which can be accessed and utilized by clients or tenants. The illustrations and examples provided herein are for clarity and simplicity.

The network environment 200 can include a network fabric 202, a Layer 2 (L2) network 204, a Layer 3 (L3) network 206, and servers 208a, 208b, 208c, 208d, and 208e (collectively, 208). The network fabric 202 can include spine switches 210a, 210b, 210c, and 210d (collectively, "210") and leaf switches 212a, 212b, 212c, 212d, and 212e (collectively, "212"). The spine switches 210 can connect to the leaf switches 212 in the network fabric 202. The leaf switches 212 can include access ports (or non-fabric ports) and fabric ports. The fabric ports can provide uplinks to the spine switches 210, while the access ports can provide connectivity to endpoints (e.g., the servers 208), internal networks (e.g., the L2 network 204), or external networks (e.g., the L3 network 206).

The leaf switches 212 can reside at the edge of the network fabric 202, and can thus represent the physical network edge. For instance, in some embodiments, the leaf switches 212d and 212e operate as border leaf switches in communication with edge devices 214 located in the external network 206. The border leaf switches 212d and 212e can be used to connect any type of external network device, service (e.g., firewall, deep packet inspector, traffic monitor, load balancer, etc.), or network (e.g., the L3 network 206) to the fabric 202.

Although the network fabric 202 is illustrated and described herein as an example leaf-spine architecture, one of ordinary skill in the art will readily recognize that various embodiments can be implemented based on any network topology, including any datacenter or cloud network fabric. Indeed, other architectures, designs, infrastructures, and variations are contemplated herein. For example, the principles disclosed herein are applicable to topologies including three-tier (including core, aggregation, and access levels), fat tree, mesh, bus, hub and spoke, etc. Thus, in some embodiments, the leaf switches 212 can be top-of-rack switches configured according to a top-of-rack architecture. In other embodiments, the leaf switches 212 can be aggregation switches in any particular topology, such as end-of-row or middle-of-row topologies. In some embodiments, the leaf switches 212 can also be implemented using aggregation switches.

Moreover, the topology illustrated in FIG. 2 and described herein is readily scalable and can accommodate a large number of components, as well as more complicated arrangements and configurations. For example, the network can include any number of fabrics 202, which can be geographically dispersed or located in the same geographic area. Thus, network nodes can be used in any suitable network topology, which can include any number of servers, virtual machines or containers, switches, routers, appliances, controllers, gateways, or other nodes interconnected to form a large and complex network. Nodes can be coupled to other nodes or networks through one or more interfaces employing any suitable wired or wireless connection, which provides a viable pathway for electronic communications.

Network communications in the network fabric 202 can flow through the leaf switches 212. In some embodiments, the leaf switches 212 can provide endpoints (e.g., the servers 208), internal networks (e.g., the L2 network 204), or external networks (e.g., the L3 network 206) access to the network fabric 202, and can connect the leaf switches 212 to each other. In some embodiments, the leaf switches 212 can connect endpoint groups (EPGs) to the network fabric 202, internal networks (e.g., the L2 network 204), and/or any external networks (e.g., the L3 network 206). EPGs are groupings of applications, or application components, and tiers for implementing forwarding and policy logic. EPGs can allow for separation of network policy, security, and forwarding from addressing by using logical application boundaries. EPGs can be used in the network environment 200 for mapping applications in the network. For example, EPGs can comprise a grouping of endpoints in the network indicating connectivity and policy for applications.

As discussed, the servers 208 can connect to the network fabric 202 via the leaf switches 212. For example, the servers 208a and 208b can connect directly to the leaf switches 212a and 212b, which can connect the servers 208a and 208b to the network fabric 202 and/or any of the other leaf switches. The servers 208c and 208d can connect to the leaf switches 212b and 212c via the L2 network 204. The servers 208c and 208d and the L2 network 204 make up a local area network (LAN). LANs can connect nodes over dedicated private communications links located in the same general physical location, such as a building or campus.

The WAN 206 can connect to the leaf switches 212d or 212e via the L3 network 206. WANs can connect geographically dispersed nodes over long-distance communications links, such as common carrier telephone lines, optical light paths, synchronous optical networks (SONET), or synchronous digital hierarchy (SDH) links. LANs and WANs can include L2 and/or L3 networks and endpoints.

The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks can be further interconnected by an intermediate network node, such as a router, to extend the effective size of each network. The endpoints, e.g. the servers 208, can include any communication device or component, such as a computer, server, blade, hypervisor, virtual machine, container, process (e.g., running on a virtual machine), switch, router, gateway, host, device, external network, etc.

In some embodiments, the network environment 200 also includes a network controller running on the host 208a. The network controller is implemented using the Application Policy Infrastructure Controller (APIC™) from Cisco®. The APIC™ provides a centralized point of automation and management, policy programming, application deployment, and health monitoring for the fabric 202. In some embodiments, the APIC™ is operated as a replicated synchronized clustered controller. In other embodiments, other configurations or software-defined networking (SDN) platforms can be utilized for managing the fabric 202.

In some embodiments, a physical server 208 can have instantiated thereon a hypervisor 216 for creating and running one or more virtual switches (not shown) and one or more virtual machines 218, as shown for the host 208b. In other embodiments, physical servers can run a shared kernel for hosting containers. In yet other embodiments, the physical server 208 can run other software for supporting other virtual partitioning approaches. Networks in accordance with various embodiments can include any number of physical servers hosting any number of virtual machines, containers, or other virtual partitions. Hosts can also comprise blade/physical servers without virtual machines, containers, or other virtual partitions, such as the servers 208a, 208c, 208d, and 208e.

The network environment 200 can also integrate a network traffic monitoring system, such as the network traffic monitoring system 100 shown in FIG. 1. For example, the network traffic monitoring system of FIG. 2 includes sensors 220a, 220b, 220c, and 220d (collectively, "220"), collectors 222, and an analytics engine, such as the analytics engine 110 of FIG. 1, executing on the server 208e. The analytics engine can receive and process network traffic data collected by the collectors 222 and detected by the sensors 220 placed on nodes located throughout the network environment 200. Although the analytics engine 208e is shown to be a standalone network appliance in FIG. 2, it will be appreciated that the analytics engine 208e can also be implemented as a virtual partition (e.g., VM or container) that can be distributed onto a host or cluster of hosts, software as a service (SaaS), or other suitable method of distribution. In some embodiments, the sensors 220 run on the leaf switches 212 (e.g., the sensor 220a), the hosts (e.g., the sensor 220b), the hypervisor 216 (e.g., the sensor 220c), and the VMs 218 (e.g., the sensor 220d). In other embodiments, the sensors 220 can also run on the spine switches 210, virtual switches, service appliances (e.g., firewall, deep packet inspector, traffic monitor, load balancer, etc.) and in between network elements. In some embodiments, sensors 220 can be located at each (or nearly every) network component to capture granular packet statistics and data at each hop of data transmission. In other embodiments, the sensors 220 may not be installed in all components or portions of the network (e.g., shared hosting environment in which customers have exclusive control of some virtual machines).

As shown in FIG. 2, a host can include multiple sensors 220 running on the host (e.g., the host sensor 220b) and various components of the host (e.g., the hypervisor sensor 220c and the VM sensor 220d) so that all (or substantially all) packets traversing the network environment 200 can be monitored. For example, if one of the VMs 218 running on the host 208b receives a first packet from the WAN 206, the first packet can pass through the border leaf switch 212d, the spine switch 210b, the leaf switch 212b, the host 208b, the hypervisor 216, and the VM. Since all or nearly all of these components contain a respective sensor, the first packet will likely be identified and reported to one of the collectors 222. As another example, if a second packet is transmitted from one of the VMs 218 running on the host 208b to the host 208d, sensors installed along the data path, such as at the VM 218, the hypervisor 216, the host 208b, the leaf switch 212b, and the host 208d will likely result in capture of metadata from the second packet.

Currently, sensors, e.g. such as those of the network traffic monitoring system 100, deployed in a network can be used to gather network traffic data related to nodes operating in the network. The network traffic data can include metadata relating to a packet, a collection of packets, a flow, a bidirectional flow, a group of flows, a session, or a network communication of another granularity. That is, the network traffic data can generally include any information describing communication on all layers of the Open Systems Interconnection (OSI) model. For example, the network traffic data can include source/destination MAC address, source/destination IP address, protocol, port number, etc. In some embodiments, the network traffic data can also include summaries of network activity or other network statistics such as number of packets, number of bytes, number of flows, bandwidth usage, response time, latency, packet loss, jitter, and other network statistics.

Gathered network traffic data can be analyzed to provide insights into the operation of the nodes in the network, otherwise referred to as analytics. In particular, discovered application or inventories, application dependencies, policies, efficiencies, resource and bandwidth usage, and network flows can be determined for the network using the network traffic data.

Sensors deployed in a network can be used to gather network traffic data on a client and server level of granularity. For example, network traffic data can be gathered for determining which clients are communicating which servers and vice versa. However, sensors are not currently deployed or integrated with systems to gather network traffic data for different segments of traffic flows forming the traffic flows between a server and a client. Specifically, current sensors gather network traffic data as traffic flows directly between a client and a server while ignoring which nodes, e.g. middleboxes, the traffic flows actually pass through in passing between a server and a client. This effectively treats the network environment between servers and clients as a black box and leads to gaps in or otherwise incomplete network traffic data and traffic flows indicated by the network traffic data.

In turn, such gaps in network traffic data and corresponding traffic flows can lead to deficiencies in diagnosing problems within a network environment. For example, a problem stemming from an incorrectly configured middlebox might be diagnosed as occurring at a client as the flow between the client and a server is treated as a black box. In another example, gaps in network traffic data between a server and a client can lead to an inability to determine whether policies are correctly enforced at a middlebox between the server and the client. There therefore exist needs for systems, methods, and computer-readable media for generating network traffic data at nodes between servers and clients, e.g. at middleboxes between the servers and clients. In particular, there exist needs for systems, methods, and computer-readable media for stitching together traffic flows at nodes between servers and clients to generate a more complete and detailed traffic flow, e.g. between the servers and the clients.

The present includes systems, methods, and computer-readable media for stitching traffic flow segments at a middlebox in a network environment to form a stitched traffic flow through the middlebox in the network environment. In particular flow records of traffic flow segments at a middlebox corresponding to one or more traffic flows passing through the middlebox can be collected. The traffic flows can pass through the middlebox between a client and a server. The flow records can include one or more transaction identifiers assigned to the traffic flow segments. Subsequently, flow directions of the traffic flow segments in the network environment with respect to the middlebox can be identified using the flow records. The traffic flow segments can be stitched together to form a stitched traffic flow of the one or more traffic flows based on the one or more transaction identifiers and the flow directions of the traffic flow segments. The stitched traffic flow can then be incorporated as part of network traffic data for the network environment.

FIG. 3 depicts a diagram of an example network environment 300 for stitching together traffic flow segments between a client and a server. The network environment 300 shown in FIG. 3 includes a client 302, a server 304 and a middlebox 306. The client 302 and the server 304 can exchange data. More specifically, the client 302 and the server 304 can exchange data as part of the client 302 accessing network services in the network environment 300 and as part of the server 304 providing the client 302 access to network services in the network environment 300. For example, the client 302 can send a request for data that can ultimately be delivered to the server 304 and the server 304 can ultimately send the data back to the client 302 as part of a reply to the request.

The client 302 and the server 304 can exchange data as part of one or more traffic flows. A traffic flow can be unidirectional or bidirectional. For example, a traffic flow can include the client 302 sending a request that is ultimately received at the server 304. Vice versa, a traffic flow can include the server 304 sending a response that is ultimately received at the client 302. In another example, a traffic flow can include both the client 302 sending a request that is ultimately received at the server 304 and the server 304 sending a response to the request that is ultimately received at the client 302. Traffic flows between the client 302 and the server 304 can form part of a traffic flow including the client 302 and other sources/destinations at different network nodes, e.g. separate from the server 304 and the client 302, within a network environment. For example, traffic flows between the client 302 and the server 304 can form part of an overall traffic flow between the client 302 and a network node within a network environment that is ultimately accessed through the server 304 and a network fabric.

In the example network environment 300 shown in FIG. 3, the client 302 and the server 304 can exchange data or otherwise communicate through the middlebox 306. A middlebox, as used herein, is an applicable networking device for controlling network traffic in the network environment 300 that passes through the middlebox. More specifically, a middlebox can be an applicable networking device for filtering, inspecting, modifying, or otherwise controlling traffic that passes through the middlebox for purposes other than actually forwarding the traffic to an intended destination. For example, a middlebox can include a firewall, an intrusion detection system, a network address translator, a WAN optimizer, and a load balancer.

In supporting exchange of data between the client 302 and the server 304, different portions of traffic flows, otherwise referred to as traffic flow segments, can be created at the middlebox 306 between the client 302 and the server 304. Specifically, the middlebox 306 can receive data from the client 302 in a first traffic flow segment 308-1. Subsequently, the middlebox 306 can provide data received from the client 302, e.g. through the first traffic flow segment 308-1, to the server 304 as part of a second traffic flow segment 308-2. Similarly, the middlebox 306 can receive data from the server 304 in a third traffic flow segment 308-3. Subsequently, the middlebox 306 can provide data received from the server 304, e.g. in the third traffic flow segment 308-3, to the client 302 as part of a fourth traffic flow segment 308-4.

All or an applicable combination of the first traffic flow segment 308-1, the second traffic flow segment 308-2, the third traffic flow segment 308-3, and the fourth traffic flow segment 308-4, (collectively referred to as the "traffic flow segments 308") can form part of a single traffic flow. For example, the first traffic flow segment 308-1 and the second traffic flow segment 308-2 can form a request transmitted from the client 302 to the server 304 and combine to form a single traffic flow between the client 302 and the server 304. In another example, the first and second traffic flow segments 308-1 and 308-2 can form a request transmitted to the server 304 and the third and fourth traffic flow segments 308-3 and 308-4 can form a response to the request. Further in the example, the traffic flow segments 308 including both the request and the response to the request can form a single traffic flow between the client 302 and the server 304.

The traffic flow segments 308 can be associated with or otherwise assigned one or more transaction identifiers. More specifically, a transaction identifier can be uniquely associated with a single traffic flow passing through the middlebox 306. Subsequently, all or a combination of the traffic flow segments 308 can be associated with a transaction identifier uniquely associated with a traffic flow formed by all or the combination of the traffic flow segments 308. For example, the traffic flow segments 308 can form a single traffic flow between the client 302 and the server 304 and each be assigned a single transaction identifier for the traffic flow. In another example, the first traffic flow segment 308-1 and the second traffic flow segment 308-2 can form a first traffic flow and the third traffic flow segment 308-3 and the fourth traffic flow segment 308-4 can form a second traffic flow. Subsequently, a transaction identifier uniquely associated with the first traffic flow can be assigned to the first traffic flow segment 308-1 and the second traffic flow segment 308-2, while a transaction identifier uniquely associated with the second traffic flow can be assigned to the third traffic flow segment 308-3 and the fourth traffic flow segment 308-4.

While the client 302 and the server 304 are shown as communicating through the middlebox 306, in the example environment shown in FIG. 3, either or both of the client 302 and the server 304 can be replaced with another middlebox. For example, the server 304 and another middlebox can communicate with each other through the middlebox 306. In another example, the client 302 and another middlebox can communicate with each other through the middlebox 306.

The example network environment shown in FIG. 3 includes a middlebox traffic flow segment collector 310 and a middlebox traffic flow stitching system 312. The middlebox traffic flow segment collector 310 functions to collect flow records for the middlebox 306. In collecting flow records for the middlebox 306, the middlebox traffic flow segment collector 310 can be implemented as an appliance. Further, the middlebox traffic flow segment collector 310 can be implemented, at least in part, at the middlebox 306. Additionally, the middlebox traffic flow segment collector 310 can be implemented, at least in part, remote from the middlebox 306. For example, the middlebox traffic flow segment collector 310 can be implemented on a virtual machine either residing at the middlebox 306 or remote from the middlebox 306.

Flow records of a middlebox can include applicable data related to traffic segments flowing through the middlebox. Specifically, flow records of a middlebox can include one or a combination of a source of data transmitted in a traffic flow segment, a destination for data transmitted in a traffic flow segment, a transaction identifier assigned to a traffic flow segment. More specifically, flow records of a middlebox can include one or a combination of an address, e.g. IP address of a source or a destination, and an identification of a port at a source or a destination, e.g. an ephemeral port, a virtual IP (herein referred to as "VIP") port, a subnet IP (herein referred to as "SNIP") port, or a server port. For example, flow records collected by the middlebox traffic flow segment collector 310 for the first traffic flow segment 308-1 and the second traffic flow segment 308-2 can include a unique identifier associated with a traffic flow formed by the segments 308-1 and 308-2 and assigned to the first and second traffic flow segments 308-1 and 308-2. Further in the example, the flow records can include an IP address of the client 302 where the first traffic flow segment 308-1 originates and a VIP port at the middlebox 306 where the first traffic flow segment 308-1 is received. Still further in the example, the flow records can include an SNIP port at the middlebox 306 where the second traffic flow segment 308-2 originates and a server port where the second traffic flow segment 308-2 is sent to for purposes of load balancing.

Data included in flow records of corresponding traffic flow segments passing through a middlebox depend on whether the traffic flow segments originate at the middlebox or end at the middlebox. For example, a flow record for the first traffic flow segment 308-1 that is collected by the middlebox traffic flow segment collector 310 can include a unique transaction identifier and indicate that the first traffic flow segment starts at the client 302 and ends at the middlebox 306. Similarly, a flow record for the second traffic flow segment 308-2 can include the unique transaction identifier, which is also assigned to the first traffic flow segment 308-1, as well as an indication that the second traffic flow segment starts at the middlebox 306 and ends at the server 304. Accordingly, flow records for traffic flow segments passing through the middlebox 306 are each rooted at the middlebox 306, e.g. by including an indication of the middlebox as a source or a destination of the traffic flow segments. Specifically, as traffic flow segments are rooted at the middlebox 306, the flow records for traffic flow segments passing through the middlebox 306 each either begin or end at the middlebox 306.

The middlebox 306 can generate flow records for traffic flow segments passing through the middlebox 306. More specifically, the middlebox 306 can associate or otherwise assign a unique transaction identifier to traffic flow segments as part of creating flow records for the traffic flow segments. For example, the middlebox 306 can assign a TID1 of a consumer request to the first traffic flow segment 308-1 as part of creating a flow record, e.g. for the first traffic flow segment 308-1. Further in the example, the middlebox 306 can determine to send the consumer request to the specific server 304, e.g. as part of load balancing. Still further in the example, the middlebox 306 can assign the TID1 of the consumer request to the second traffic flow segment 308-1 as the consumer request is transmitted to the server 304 through the second traffic flow segment 308-2, e.g. as part of the load balancing. Subsequently, the middlebox 306 can export the generated flow segments for traffic flow segments passing through the middlebox 306.

Additionally, the middlebox 306 can modify a flow record for a traffic flow segment by associating the traffic flow segment with a transaction identifier as part of exporting the flow record. For example, the middlebox 306 can determine to export a flow record for a traffic flow segment. Subsequently, before exporting the flow record, the middlebox 306 can associate the traffic flow segment with a transaction identifier and subsequently modify the flow record to include the transaction identifier. The middlebox 306 can then export the modified flow record including the transaction identifier.

The middlebox traffic flow segment collector 310 can collect flow records from the middlebox 306 as the flow records are completed or otherwise generated by the middlebox 306. Specifically, the middlebox 306 can generate and/or export flow records for traffic flow segments as all or portions of corresponding traffic flows actually pass through the middlebox 306. More specifically, the middlebox 306 can create and export traffic flow records as either or both the first traffic flow segment 308-1 and the second traffic flow segment 308-2 are completed at the middlebox 306. Additionally, the middlebox 306 can generate and/or export flow records for traffic flow segments once a corresponding traffic flow formed by the segments is completed through the middlebox 306. For example, the middlebox 306 can create and export traffic flow records for the traffic flow segments 308 once all of the traffic flow segments 308 are transmitted to complete a traffic flow through the middlebox 306. Further in the example, the middlebox 306 can recognize that a consumer to producer flow is complete, e.g. the first and traffic flow segments 308-1 and 308-2 are complete or all of the traffic flow segments 308 are completed, and subsequently the middlebox 306 can export one or more corresponding flow records to the middlebox traffic flow segment collector 310.

The middlebox traffic flow segment collector 310 can receive or otherwise collect traffic flow records from the middlebox 306 according to an applicable protocol for exporting flow records, e.g. from a middlebox. More specifically, the middlebox 306 can export flow records to the middlebox traffic flow segment collector 310 according to an applicable protocol for exporting flow records, e.g. from a middlebox. For example, the middlebox 306 can export flow records to the middlebox traffic flow segment collector 310 using an Internet Protocol Flow Information Export (herein referred to as "IPFIX") protocol. In another example, the middlebox 306 can export flow records to the middlebox traffic flow segment collector 310 using a NetFlow Packet transport protocol.

While flow records can indicate traffic flow segments are rooted at the middlebox 306, the flow records for traffic segments passing through the middlebox 306 can fail to link the traffic flow segments, e.g. through the middlebox 306. Specifically, flow records for the first traffic flow segment 308-1 can indicate that the first traffic flow segment 308-1 ends at the middlebox 306 while flow records for the second traffic flow segment 308-2 can indicate that the second traffic flow segment 308-2 begins at the middlebox 306, while failing to link the first and second traffic flow segments 308-1 and 308-2. This is problematic in synchronizing or otherwise identifying how the server 304 and the client 302 communicate through the middlebox 306. Specifically, failing to link traffic flow segments through the middlebox 306 leads to a view from a server-side perspective that all flows end in the middlebox 306. Similarly, failing to link traffic flow segments through the middlebox 306 leads to a view from a client-side perspective that all flows end in the middlebox 306. This can correspond to gaps in mapping traffic flows between the client 302 and the server 304, e.g. the middlebox 306 is treated like a black box without linking the client 302 with the server 304. In turn, this can lead to deficiencies in diagnosing problems within the network environment 300. For example, a failed policy check at the middlebox 306 can mistakenly be identified as happening at the client 302 even though it actually occurs at the middlebox 306. Specifically, the failed policy check can be triggered by a failure of the middlebox 306 to route data according to the policy between the client 302 and the server 304, however since the traffic flow segments between the middlebox 306 and the client 302 are not linked with the traffic flow segments between the middlebox 306 and the server 304, the failed policy check can be identified from a traffic flow segment as occurring at the client 302 instead of the middlebox 306.

The middlebox traffic flow stitching system 312 functions to stitch together traffic flow segments passing through the middlebox 306 to create a stitched traffic flow at the middlebox 306. For example, the middlebox traffic flow stitching system 312 can stitch together the first traffic flow segment 308-1, the second traffic flow segment 308-2, the third traffic flow segment 308-3, and the fourth traffic flow segment 308-4 to form a stitched traffic flow. Stitched traffic flows can be represented or otherwise used to create corresponding flow data. Flow data for a stitched traffic flow can include identifiers of stitched traffic flow segments, e.g. identifiers of sources and destinations of the traffic flow segments, and transactions associated with the stitched traffic flow segments, e.g. associated transaction identifiers.

In stitching together traffic flow segments at the middlebox 306 to create a stitched traffic flow, the middlebox 306 no longer functions as a black box with respect to traffic flows passing through the middlebox 306. Specifically, from both a server side perspective and a client side perspective, a traffic flow can be viewed as actually passing through the middlebox 306 to the client 302 or the server 304 and not just as traffic flow segments that only originate at or end at the middlebox 306. More specifically, the traffic flow can be viewed as a completed traffic flow through the middlebox 306 instead of merely beginning at or ending at the middlebox 306. This is advantageous as it allows for more complete and insightful network monitoring, leading to more accurate problem diagnosing and solving. For example, as traffic flows are seen as actually passing through the middlebox 306, middlebox 306 misconfigurations can be identified from the traffic flows, e.g. as part of monitoring network environments.

Traffic flows at the middlebox 306 stitched together by the middlebox traffic flow stitching system 312 can be used to enforce policies at middleboxes, including the middlebox 306. Specifically, stitched traffic flows generated by the middlebox traffic flow stitching system 312 can be used to identify dependencies between either or both servers and clients. For example, stitched traffic flows generated by the middlebox traffic flow stitching system 312 can be used to generate application dependency mappings between different applications at servers and clients. Subsequently, policies can be set and subsequently enforced at the middlebox 306 based on dependencies identified using stitched traffic flows generated by the middlebox traffic flow stitching system 312. For example, a policy to load balance communications between clients and servers can be identified according to an application dependency mapping between the clients and the servers identified through stitched traffic flows at the middlebox 306. Further in the example, the policy can subsequently be enforced at the middlebox 306 to provide load balancing between the clients and the servers.

The middlebox traffic flow stitching system 312 can stitch together traffic flow segments passing through the middlebox 306 based on flow records collected from the middlebox 306. Specifically, the middlebox traffic flow stitching system 312 can stitch together traffic flow segments based on flow records collected by the middlebox traffic flow segment collector 310 from the middlebox 306. In using flow records to stitch together traffic flow segments, the middlebox traffic flow stitching system 312 can stitch together traffic flow segments based on transaction identifiers assigned to the traffic flow segments, as indicated by the flow records. Specifically, the middlebox traffic flow stitching system 312 can stitch together traffic flow segments that are assigned the same transaction identifiers. For example, the traffic flow segments 308 can all have the same assigned transaction identifier, and the middlebox traffic flow stitching system 312 can stitch together the traffic flow segments 308 to form a stitched traffic flow based on the shared transaction identifier.

Further, the middlebox traffic flow stitching system 312 can identify flow directions of traffic flow segments passing through the middlebox 306 using flow records collected from the middlebox 306 by the middlebox traffic flow segment collector 310. Specifically, the middlebox traffic flow stitching system 312 can identify flow directions of traffic flow segments with respect to the middlebox 306 using flow records collected from the middlebox 306. For example, the middlebox traffic flow stitching system 312 can use flow records from the middlebox 306 to identify the fourth traffic flow segment 308-4 flows from the middlebox 306 to the client 302. The middlebox traffic flow stitching system 312 can use identified sources and destinations of traffic flow segments, as indicated by flow records, to identify flow directions of the traffic flow segments. For example, the middlebox traffic flow stitching system 312 can determine the first traffic flow segment 308-1 flows from the client 302 to the middlebox 306 based on an identification of a client IP address as the source of the first traffic flow segment 308-1 and an identification of a VIP port at the middlebox 306.

In stitching together traffic flow segments based on flow records, the middlebox traffic flow stitching system 312 can stitch together the traffic flow segments based on directions of the traffic flow segments identified from the flow records.

For example, the middlebox traffic flow stitching system 312 can stitch together the first traffic flow segment 308-1 with the second traffic flow segment 308-2 based on the identified direction of the first and second traffic flow segments 308-1 and 308-2 from the client 302 towards the server 304. Additionally, in stitching together traffic flow segments based on flow records, the middlebox traffic flow stitching system 312 can stitch together the traffic flow segments based on directions of the traffic flow segments and also transaction identifiers assigned to the traffic flow segments. For example, the middlebox traffic flow stitching system 312 can stitch the third and fourth traffic flow segments 308-3 and 308-4 together based on the segments having the same transaction identifier and the shared direction of the segments from the server 304 to the client 302.

The middlebox traffic flow stitching system 312 can stitch together traffic flow segments in an order based on flow directions of the traffic flow segments. More specifically, the middlebox traffic flow stitching system 312 can use a shared transaction identifier to determine traffic flow segments to stitch together, and stitch the traffic flow segments in a specific order based on flow directions of the traffic flow segments to form a stitched traffic flow. For example, the middlebox traffic flow stitching system 312 can determine to stitch the traffic flow segments 308 based on a shared transaction identifier assigned to the traffic flow segments 308. Further in the example, the middlebox traffic flow stitching system 312 can determine to stitch the second traffic flow segment 308-2 after the first traffic flow segment 308-1, stitch the third traffic flow segment 308-3 after the second traffic flow segment 308-2, and stitch the third traffic flow segment 308-4 after the third traffic flow segment 308-2, based on corresponding identified flow directions of the flow segments 308, e.g. with respect to the middlebox 306.

The middlebox traffic flow stitching system 312 can incorporate stitched traffic flows through the middlebox 306 as part of network traffic data for the network environment. For example, the middlebox traffic flow stitching system 312 can include stitched traffic flows through the middlebox 306 with other traffic flows in the network environment, e.g. from servers to nodes in a network fabric. The middlebox traffic flow stitching system 312 can incorporate stitched traffic flows as part of network traffic data generated by an applicable network traffic monitoring system, such as the network traffic monitoring system 100 shown in FIG. 1. In incorporating stitched traffic flows with network traffic data generated by a network traffic monitoring system, all or portions of the middlebox traffic flow stitching system 312 can be integrated at the network traffic monitoring system. For example, a portion of the middlebox traffic flow stitching system 312 implemented at a network traffic monitoring system can received stitched traffic flows from a portion of the middlebox traffic flow stitching system 312 implemented at the middlebox traffic flow segment collector 310. Subsequently, the middlebox traffic flow stitching system 312, e.g. implemented at the network traffic monitoring system can incorporate the stitched traffic flows into network traffic data generated by the network traffic monitoring system.

In incorporating stitched traffic flows into network traffic data, the middlebox traffic flow stitching system 312 can extend network traffic flows in the network traffic data based on the stitched traffic flows. Specifically, the middlebox traffic flow stitching system 312 can stitch already stitched traffic flows extending through the middlebox 306 to the client with other stitched traffic flows extending into the network environment 300. More specifically, the middlebox traffic flow stitching system 312 can stitch already stitched traffic flows through the middlebox 306 with other traffic flows that extend from the server 304 to other servers or nodes in the network environment 300. For example, the middlebox traffic flow stitching system 312 can stitch together a traffic flow extending from a network fabric to the server 304 with a stitched traffic flow through the middlebox 306 to the client 302. This can create a completed traffic flow from the network fabric to the client 302 through the middlebox 306.

FIG. 4 illustrates a flowchart for an example method of stitching traffic flows passing through a middlebox. The method shown in FIG. 4 is provided by way of example, as there are a variety of ways to carry out the method. Additionally, while the example method is illustrated with a particular order of blocks, those of ordinary skill in the art will appreciate that FIG. 4 and the blocks shown therein can be executed in any order and can include fewer or more blocks than illustrated.

Each block shown in FIG. 4 represents one or more steps, processes, methods or routines in the method. For the sake of clarity and explanation purposes, the blocks in FIG. 4 are described with reference to the network environment shown in FIG. 3.

At step 400, the middlebox traffic flow segment collector 310 collects flow records of traffic flow segments at a middlebox in a network environment corresponding to one or more traffic flows passing through the middlebox. The flow records can include one or more transaction identifiers assigned to the traffic flow segments. The flow records of the traffic flow segments at the middlebox can be generated by the middlebox and subsequently exported to the middlebox traffic flow segment collector 310. More specifically, the flow records can be exported to the middlebox traffic flow segment collector 310 through the IPFIX protocol. The flow records can be exported to the middlebox traffic flow segment collector 310 after each of the traffic flow segments is established, e.g. through the middlebox. Alternatively, the flow records can be exported to the middlebox traffic flow segment collector 410 after a corresponding traffic flow of the traffic flow segments is completed, e.g. through the middlebox.

At step 402, the middlebox traffic flow stitching system 312 identifies flow directions of the traffic flow segments in the network environment with respect to the middlebox using the flow records. For example, the middlebox traffic flow stitching system 312 can identify whether a traffic flow segment is passing from a client to the middlebox towards a server using the flow records. In another example, the middlebox traffic flow stitching system 312 can identify whether a traffic flow segment is passing from a server to the middlebox towards a client using the flow records. The middlebox traffic flow stitching system 312 can identify flow directions of the traffic flow segments based on either or both sources and destinations of the traffic flow segments included as part of the flow records. For example, the middlebox traffic flow stitching system 312 can identify a flow direction of a flow segment based on an IP address of a server where the flow segment started and a SNIP port on the middlebox that ends the flow segment at the middlebox.

At step 404, the middlebox traffic flow stitching system 312 stitches together the traffic flow segments to form a stitched traffic flow of the one or more traffic flows passing through the middlebox. More specifically, the traffic flow stitching system 312 can stitch together the traffic flow segments to form a stitched traffic flow of the one or more traffic flows based on one or more transaction identifiers assigned to the traffic flow segments and the flow directions of the traffic flow segments in the network environment. For example, the traffic flow segments sharing the same transaction identifier can be stitched together based on the directions of the traffic flow segments form the stitched traffic flow, e.g. based on the flow records. More specifically, the one or more transaction identifiers assigned to the traffic flow segments can be indicated by the flow records collected at step 400 and subsequently used to stitch the traffic flow segments together.

At step 406, the middlebox traffic flow stitching system 312 incorporates the stitched traffic flow as part of network traffic data for the network environment. Specifically, the stitched traffic flow can be incorporated as part of identified traffic flows in the network environment that are included as part of the network traffic data for the network environment. For example, the stitched traffic flow can be stitched to traffic flows identified in a network fabric of the network environment, as part of incorporating the stitched traffic flow with network data for the network environment including the network fabric.

FIG. 5 shows an example middlebox traffic flow stitching system 500. The middlebox traffic flow stitching system 500 can function according to an applicable system for stitching together traffic flow segments through a middlebox to form a stitched traffic flow, such as the middlebox traffic flow stitching system 312 shown in FIG. 3. The middlebox traffic flow stitching system 500 can stitch together traffic flows using flow records collected or otherwise exported from a middlebox. Specifically, the middlebox traffic flow stitching system 500 can identify flow directions of traffic flow segments and subsequently stitch together traffic flows based on transaction identifiers assigned to the traffic flow segments and flow directions of the traffic flow segments.

All of portions of the middlebox traffic flow stitching system 500 can be implemented at an applicable collector for collecting flow records from a middlebox, such as the middlebox traffic flow segment collector 310 shown in FIG. 3. Additionally, all or portions of the middlebox traffic flow stitching system 500 can be implemented at a middlebox, e.g. as part of an agent. Further, all or portions of the middlebox traffic flow stitching system 500 can be implemented at an applicable system for monitoring network traffic in a network environment, such as the network traffic monitoring system 100 shown in FIG. 1.

The middlebox traffic flow stitching system 500 includes a flow records hash table maintainer 502, a flow records hash table datastore 504, a traffic flow segment stitcher 506, and a completed flow identifier 508. The flow records hash table maintainer 502 functions to maintain a flow records hash table. The flow records hash table maintainer 502 can maintain a hash table based on flow records collected from or otherwise exported by a middlebox. In maintaining a flow records hash table, the flow records hash table maintainer 502 can generate and update one or more flow records hash table stored in the flow records hash table datastore 504.

TABLE 1

| T1 | C -> VIP |
|----|----------|
| T1 | IP -> Server |
| T1 | Server -> IP |
| T1 | VIP -> C |
| T2 | C->VIP |

Table 1, shown above, illustrates an example of a flow records hash table maintained by the flow records hash table maintainer 502 and stored in the flow records hash table datastore 504. The example flow records hash table includes a plurality of entries. Each entry corresponds to a traffic flow segment passing through a middlebox. Further, each entry includes a transaction identifier and a source and destination identifier for each traffic flow segment. For example, the first entry corresponds to a traffic flow segment passing from the client, C, to a port on the middlebox, VIP. Further in the example, the first entry includes a transaction identifier, T1, assigned to the traffic flow segment, e.g. by a middlebox. In another example, the second entry corresponds to a second traffic flow segment passing from the middlebox, IP, to a server, signified by "Server" in the entry. Flow records hash tables can include entries with different transaction identifiers corresponding to different traffic flows. Specifically, the example flow records hash table has a first entry including a first transaction identifier T1 and a fifth entry including a second transaction identifier T2.

The traffic flow segment stitcher 506 functions to stitch together traffic flow segments at a middlebox to form a stitched traffic flow corresponding to a traffic flow through the middlebox. Specifically, the traffic flow segment stitcher 506 can stitch together traffic flow segments using a flow records hash table, e.g. stored in the flow records hash table datastore 504. In using a flow records hash table to stitch together traffic flow segments, the traffic flow segment stitcher 506 can stitch together traffic flows based on transaction identifiers included as part of entries corresponding to traffic flow segments in the flow records hash table. For example, the traffic flow segment stitcher 506 can stitch together a first traffic flow segment corresponding to the first entry in the example hash table and a second traffic flow segment corresponding to the second entry in the example hash table based on both entries including the same transaction identifier T1.

In using a flow records hash table to stitch together traffic flow segments, the traffic flow segment stitcher 506 can group entries in the hash table to form grouped entries and subsequently use the grouped entries to stitch traffic flow segments. More specifically, the traffic flow segment stitcher 506 can group entries that share a transaction identifier to form grouped entries. For example, the traffic flow segment stitcher 506 can group the first four entries together based on the entries all having the same transaction identifier T1. Subsequently, based on entries being grouped together to form grouped entries, the traffic flow segment stitcher 506 can stitch together traffic flows corresponding to the entries in the grouped entries. For example, the traffic flow segment stitcher 506 can group the first four entries in the example flow records hash table and subsequently stitch traffic flow segments corresponding to the first four entries based on the grouping of the first four entries.

Further, in using a flow records hash table to stitch together traffic flow segments, the traffic flow segment stitcher 506 can identify flow directions of the traffic flow segments based on corresponding entries of the traffic flow segments in the flow records hash table. More specifically, the traffic flow segment stitcher 506 can identify flow directions of traffic flow segments based on identifiers of sources and destinations of the segments in corresponding entries in a flow records hash table. For example, the traffic flow segment stitcher 506 can identify that a traffic flow segment corresponding to the first entry in the example hash table moves from a client to a middlebox based on the flow segment originating at the client and terminating at a VIP port at the middlebox, as indicated by the first entry in the table. Subsequently, using flow directions of traffic flow segments identified from a flow records hash table, the traffic flow segment stitcher 506 can actually stitch together the traffic flow segments. For example, the traffic flow segment stitcher 506 can stitch a traffic flow segment corresponding to the fourth entry in the example hash table after a traffic flow segment corresponding to the third entry in the example hash table.

The traffic flow segment stitcher 506 can stitch together traffic flow segments based on both directions of the traffic flow segments, as identified from corresponding entries in a flow records hash table, and transaction identifiers included in the flow records hash table. Specifically, the traffic flow segment stitcher 506 can identify to stitch together traffic flow segments with corresponding entries in a flow records hash table that share a common transaction identifier. For example, the traffic flow segment stitcher 506 can determine to stitch together traffic flow segments corresponding to the first four entries in the example flow records hash table based on the first four entries sharing the same transaction identifier T1. Additionally, the traffic flow segment stitcher 506 can determine an order to stitch together traffic flow segments based on flow directions of the traffic flow segments identified from corresponding entries of the segments in a flow records hash table. For example, the traffic flow segment stitcher 506 can determine to stitch together a third traffic flow segment corresponding to the third entry in the example hash table after a second traffic flow segment corresponding to the second entry in the example hash table based on flow directions of the segments identified from the entries.

The completed flow identifier 508 functions to identify a completed traffic flow occurring through the middlebox. A completed traffic flow can correspond to establishment of a connection between a client and a server and vice versa. For example, a completed traffic flow can include a request transmitted from a client to a middlebox, and the request transmitted from the middlebox to a server. Further in the example, the completed traffic flow can include completion of the request from the client to the server through the middlebox and completion of a response to the request from the server to the client through the middlebox. The completed flow identifier 508 can identify a completed flow based on flow records. More specifically, the completed flow identifier 508 can identify a completed flow based on a flow records hash table. For example, the completed flow identifier 508 can identify the first four entries form a completed flow based on both the first entry beginning at the client and the last entry ending at the client, and all entries having the same transaction identifier T1.

The traffic flow segment stitcher 506 can push or otherwise export traffic flow data for stitched traffic flows. More specifically, the traffic flow segment stitcher 506 can export traffic flow data for incorporation with network traffic data for a network environment. For example, the traffic flow segment stitcher 506 can export traffic flow data to the network traffic monitoring system 100, where the traffic flow data can be combined with network traffic data for a network environment. The traffic flow segment stitcher 506 can push traffic flow data based on identification of a completed traffic flow by the completed flow identifier 508. More specifically, the traffic flow segment stitcher 506 can export traffic flow data indicating a stitched traffic flow of a completed traffic flow upon identification that the traffic flow is actually a completed flow. This can ensure that data for stitched traffic flows is only pushed or otherwise provided when it is known that the stitched traffic flows correspond to completed traffic flows.

The disclosure now turns to FIGS. 6 and 7, which illustrate example network devices and computing devices, such as switches, routers, load balancers, client devices, and so forth.

FIG. 6 illustrates an example network device 600 suitable for performing switching, routing, load balancing, and other networking operations. Network device 600 includes a central processing unit (CPU) 604, interfaces 602, and a bus 610 (e.g., a PCI bus). When acting under the control of appropriate software or firmware, the CPU 604 is responsible for executing packet management, error detection, and/or routing functions. The CPU 604 preferably accomplishes all these functions under the control of software including an operating system and any appropriate applications software. CPU 604 may include one or more processors 608, such as a processor from the INTEL X86 family of microprocessors. In some cases, processor 608 can be specially designed hardware for controlling the operations of network device 600. In some cases, a memory 606 (e.g., non-volatile RAM, ROM, etc.) also forms part of CPU 604. However, there are many different ways in which memory could be coupled to the system.

The interfaces 602 are typically provided as modular interface cards (sometimes referred to as "line cards"). Generally, they control the sending and receiving of data packets over the network and sometimes support other peripherals used with the network device 600. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 604 to efficiently perform routing computations, network diagnostics, security functions, etc.

Although the system shown in FIG. 6 is one specific network device of the present subject matter, it is by no means the only network device architecture on which the present subject matter can be implemented. For example, an architecture having a single processor that handles communications as well as routing computations, etc., is often used. Further, other types of interfaces and media could also be used with the network device 600.

Regardless of the network device's configuration, it may employ one or more memories or memory modules (including memory 606) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 606 could also hold various software containers and virtualized execution environments and data.

The network device 600 can also include an application-specific integrated circuit (ASIC), which can be configured to perform routing and/or switching operations. The ASIC can communicate with other components in the network device 600 via the bus 610, to exchange data and signals and coordinate various types of operations by the network device 600, such as routing, switching, and/or data storage operations, for example.

FIG. 7 illustrates a computing system architecture 700 wherein the components of the system are in electrical communication with each other using a connection 705, such as a bus. Exemplary system 700 includes a processing unit (CPU or processor) 710 and a system connection 705 that couples various system components including the system memory 715, such as read only memory (ROM) 720 and random access memory (RAM) 725, to the processor 710. The system 700 can include a cache of high-speed memory connected directly with, in close proximity to, or integrated as part of the processor 710. The system 700 can copy data from the memory 715 and/or the storage device 730 to the cache 712 for quick access by the processor 810. In this way, the cache can provide a performance boost that avoids processor 710 delays while waiting for data. These and other modules can control or be configured to control the processor 710 to perform various actions. Other system memory 715 may be available for use as well. The memory 715 can include multiple different types of memory with different performance characteristics. The processor 710 can include any general purpose processor and a hardware or software service, such as service 1 732, service 2 734, and service 3 736 stored in storage device 730, configured to control the processor 710 as well as a special-purpose processor where software instructions are incorporated into the actual processor design. The processor 710 may be a completely self-contained computing system, containing multiple cores or processors, a bus, memory controller, cache, etc. A multi-core processor may be symmetric or asymmetric.

To enable user interaction with the system 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the system 700. The communications interface 740 can generally govern and manage the user input and system output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof.

The storage device 730 can include services 732, 734, 736 for controlling the processor 710. Other hardware or software modules are contemplated. The storage device 730 can be connected to the system connection 705. In one aspect, a hardware module that performs a particular function can include the software component stored in a computer-readable medium in connection with the necessary hardware components, such as the processor 710, connection 705, output device 735, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A method comprising:
    collecting flow records of traffic flow segments at a middlebox in a network environment corresponding to one or more traffic flows passing through the middlebox, the flow records including one or more transaction identifiers assigned to the traffic flow segments;
    identifying flow directions of the traffic flow segments in the network environment with respect to the middlebox using the flow records;
    maintaining a hash table including entries for each of the traffic flow segments at the middlebox, wherein each entry includes a transaction identifier of the one or more transaction identifiers assigned to the traffic flow segment;
    grouping together the entries in the hash table of traffic flow segments having shared transaction identifiers of the one or more transaction identifiers;
    stitching together the traffic flow segments to form a stitched traffic flow of the one or more traffic flows passing through the middlebox in the network environment based on the entries of the traffic flow segments grouped together according to the shared transaction identifiers and the flow directions of the traffic flow segments in the network environment with respect to the middlebox; and
    incorporating the stitched traffic flow as part of network traffic data for the network environment.

2. The method of claim 1, wherein the one or more traffic flows pass through the middlebox directly between a client and a server.

3. The method of claim 1, wherein the one or more traffic flows pass through the middlebox to another middlebox in the network environment.

4. The method of claim 1, wherein the flow records are collected from the middlebox as the middlebox exports the flow records using an Internet Protocol Flow Information Export protocol.

5. The method of claim 1, wherein the flow records include sources and destinations of the traffic flow segments at the middlebox, and the sources and the destinations of the traffic flow segments are used to stitch together the traffic flow segments to form the stitched traffic flow at the middlebox.

6. The method of claim 5, wherein the sources and the destinations of the traffic flow segments are used to identify the flow directions of the traffic flow segments in the network environment with respect to the middlebox.

7. The method of claim 1, further comprising: identifying whether the stitched traffic flow forms a complete flow from the one or more traffic flows for a transaction between two entities in a network environment; and if it is determined that the stitched traffic flow forms the complete flow for the transaction between the two entities in a network environment, then pushing traffic flow data for the stitched traffic flow to a network traffic monitoring system remote from the middlebox to incorporate the stitched traffic flow as part of the network traffic data for the network environment.

8. The method of claim 7, wherein the two entities include a client and a server.

9. The method of claim 8, wherein the complete flow of the transaction between the client and the server includes a request sent from the client to the middlebox and included as part of the traffic flow segments at the middlebox, the request sent from the middlebox to the server and included as part of the traffic flow segments at the middlebox, a response to the request sent from the server to the middlebox and included as part of the traffic flow segments at the middlebox, and the response to the request sent from the middlebox to the client and included as part of the traffic flow segments at the middlebox.

10. The method of claim 1,
    wherein each hash table entry includes a source and a destination of data in a corresponding traffic flow segment of the hash table entry, the method further comprising
    using the hash table of the traffic flow segments at the middlebox to form the stitched traffic flow at the middlebox in the network environment based on sources and destinations of the traffic flow segments included in the entries of the traffic flow segments in the hash table.

11. The method of claim 10, further comprising identifying the flow directions of the traffic flow segments in the network environment using the hash table.

12. The method of claim 11, further comprising identifying the flow directions of the traffic flow segments in the network environment based on the sources and destinations of the traffic flow segments included in the entries of the traffic flow segments in the hash table.

13. The method of claim 1, wherein the stitched traffic flow is used to create an application dependency mapping as part of the network traffic data for the network environment.

14. The method of claim 1, wherein the stitched traffic flow is used to create a policy for the middlebox.

15. A system comprising:
    one or more processors; and at least one non-transitory computer-readable storage medium having stored therein instructions which, when executed by the one or more processors, cause the one or more processors to perform operations comprising:
    collecting flow records of traffic flow segments at a middlebox in a network environment corresponding to one or more traffic flows passing between a client and a server directly through the middlebox, the flow records including one or more transaction identifiers assigned to the traffic flow segments;
    identifying flow directions of the traffic flow segments in the network environment with respect to the middlebox using the flow records;
    maintaining a hash table including entries for each of the traffic flow segments at the middlebox, wherein each entry includes a transaction identifier of the one or more transaction identifiers assigned to the traffic flow segment;
    grouping together the entries in the hash table of traffic flow segments having shared transaction identifiers of the one or more transaction identifiers;
    stitching together the traffic flow segments to form a stitched traffic flow of the one or more traffic flows passing through the middlebox in the network environment based on the entries of the traffic flow segments grouped together according to the shared transaction identifiers and the flow directions of the traffic flow segments in the network environment with respect to the middlebox; and
    incorporating the stitched traffic flow as part of network traffic data for the network environment.

16. The system of claim 15, wherein the flow records include sources and destinations of the traffic flow segments at the middlebox, and the sources and the destinations of the traffic flow segments are used to stitch together the traffic flow segments to form the stitched traffic flow at the middlebox.

17. The system of claim 15, wherein the traffic flow segments includes a request sent from the client to the middlebox and included as part of the traffic flow segments at the middlebox, the request sent from the middlebox to the server and included as part of the traffic flow segments at the middlebox, a response to the request sent from the server to the middlebox and included as part of the traffic flow segments at the middlebox, and the response to the request sent from the middlebox to the client and included as part of the traffic flow segments at the middlebox.

18. The system of claim 17, wherein the instructions which, when executed by the one or more processors, further cause the one or more processors to perform operations comprising: determining if the response to the request is sent directly from the server to the client through the middlebox; and generating the network traffic data to indicate the stitched traffic flow passes directly from the server to the client through the middlebox if it is determined that the response to the request is sent directly from the server to the client through the middlebox.

19. The system of claim 15, wherein each hash table entry includes a source and a destination of data in a corresponding traffic flow segment of the hash table entry and the instructions which, when executed by the one or more processors, further cause the one or more processors to perform operations comprising:
  using the hash table of the traffic flow segments at the middlebox to form the stitched traffic flow at the middlebox in the network environment based on sources and destinations of the traffic flow segments included in the entries of the traffic flow segments in the hash table.

20. A non-transitory computer-readable storage medium having stored therein instructions which, when executed by a processor, cause the processor to perform operations comprising:
  collecting flow records of traffic flow segments at a middlebox in a network environment corresponding to one or more traffic flows passing through the middlebox, the flow records including one or more transaction identifiers assigned to the traffic flow segments;
  identifying flow directions of the traffic flow segments in the network environment with respect to the middlebox using the flow records;
  maintaining a hash table including entries for each of the traffic flow segments at the middlebox, wherein each entry includes a transaction identifier of the one or more transaction identifiers assigned to the traffic flow segment;
  grouping together the entries in the hash table of traffic flow segments having shared transaction identifiers of the one or more transaction identifiers;
  stitching together the traffic flow segments to form a stitched traffic flow of the one or more traffic flows passing through the middlebox in the network environment based on the entries of the traffic flow segments grouped together according to the shared transaction identifiers and the flow directions of the traffic flow segments in the network environment with respect to the middlebox; and
  incorporating the stitched traffic flows as part of an application dependency mapping included as part of network traffic data for the network environment.

* * * * *

UNITED STATES PATENT AND TRADEMARK OFFICE
CERTIFICATE OF CORRECTION

| | | |
|---|---|---|
| PATENT NO. | : 10,574,575 B2 | Page 1 of 1 |
| APPLICATION NO. | : 15/966561 | |
| DATED | : February 25, 2020 | |
| INVENTOR(S) | : Supreeth Rao et al. | |

It is certified that error appears in the above-identified patent and that said Letters Patent is hereby corrected as shown below:

On the Title Page

Item (72) Inventors, please change "Micheal Watts" to --Michael Watts--.

Signed and Sealed this
Twenty-first Day of July, 2020

Andrei Iancu
*Director of the United States Patent and Trademark Office*